(12) United States Patent
Ikeda

(10) Patent No.: US 8,810,837 B2
(45) Date of Patent: Aug. 19, 2014

(54) SCANNING SYSTEM, PRINTING SYSTEM, SERVICE PROVIDING SYSTEM, AND CONTROL METHOD

(75) Inventor: Motoki Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/342,286

(22) Filed: Jan. 3, 2012

(65) Prior Publication Data

US 2012/0182575 A1 Jul. 19, 2012

(30) Foreign Application Priority Data

Jan. 13, 2011 (JP) ................................. 2011-005243

(51) Int. Cl.
*G06F 3/00* (2006.01)
*H04N 1/00* (2006.01)

(52) U.S. Cl.
USPC ........................... 358/1.15; 358/400; 358/403

(58) Field of Classification Search
None
See application file for complete search history.

(56) References Cited

U.S. PATENT DOCUMENTS

| 5,911,044 | A * | 6/1999 | Lo et al. ........................ 709/203 |
| 8,508,769 | B2 * | 8/2013 | Matsuzawa .................. 358/1.15 |
| 2009/0116052 | A1 * | 5/2009 | Matsuzawa .................. 358/1.14 |
| 2010/0208297 | A1 * | 8/2010 | Takamiya ..................... 358/1.15 |
| 2010/0259799 | A1 * | 10/2010 | Shibao ........................... 358/448 |
| 2011/0134475 | A1 * | 6/2011 | Ooba ............................. 358/1.15 |
| 2011/0170122 | A1 * | 7/2011 | Kihara et al. .................. 358/1.9 |
| 2012/0162702 | A1 * | 6/2012 | Takamiya ..................... 358/1.15 |

FOREIGN PATENT DOCUMENTS

JP 08-265498 A 10/1996

* cited by examiner

*Primary Examiner* — King Poon
*Assistant Examiner* — Vincent Peren
(74) *Attorney, Agent, or Firm* — Carter, DeLuca, Farrell & Schmidt, LLP

(57) ABSTRACT

A scanning system comprises a server, scanner, and terminal, the server including: a reception unit configured to receive a scan setting and a start instruction from one of the scanner and the terminal; a storage unit configured to store the scan setting and to issue the identification information; a determination unit configured to determine which of the scanner and the terminal has transferred the scan setting and the start instruction; and a processing unit configured, when the determination unit determines that the scanner has transferred the scan setting and the start instruction, to transfer the scan setting and the start instruction to the scanner, and when the determination unit determines that the terminal has transferred the scan setting and the start instruction, to cause the storage unit to store the scan setting and to transfer, to the scanner, identification information indicating the stored scan setting.

8 Claims, 30 Drawing Sheets

F I G. 1
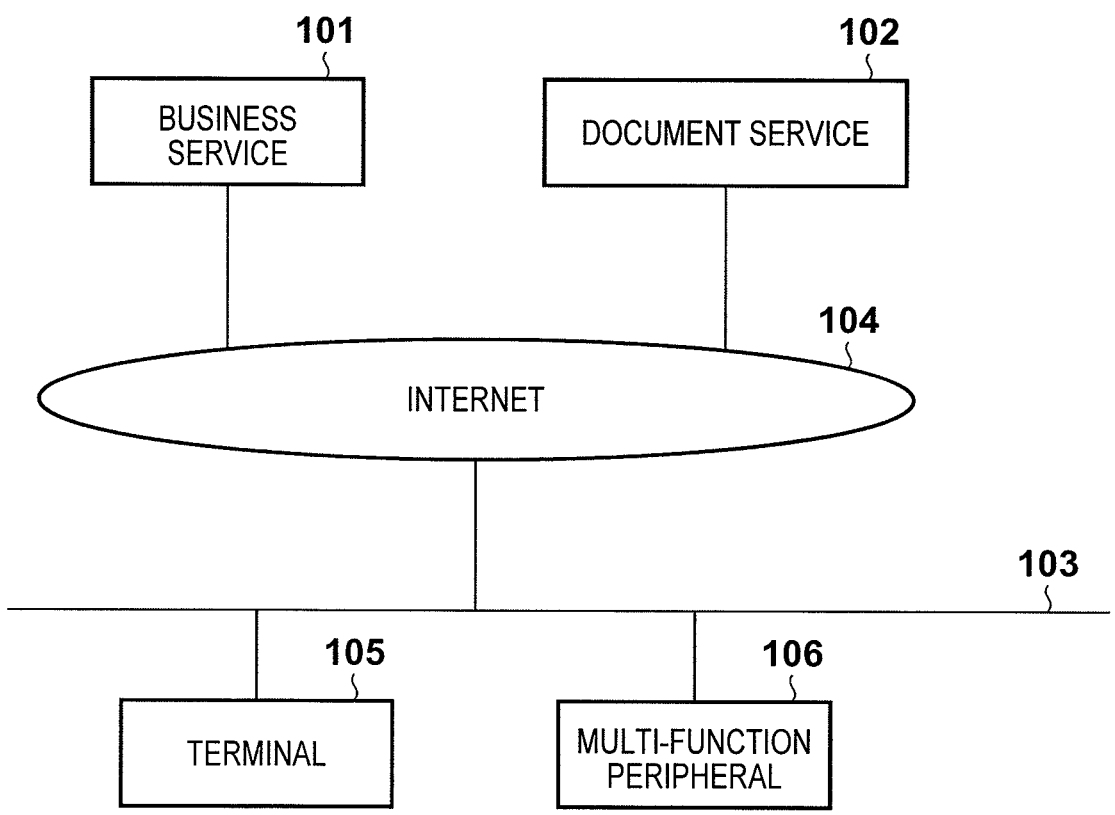

FIG. 4

| ID | IP ADDRESS | COMMENT | MODEL CODE | GLOBAL ADDRESS | USER |
|---|---|---|---|---|---|
| 1 | 172.xxx.93.101 | OA ON WEST SIDE | iR-ADV_C0001 | 172.xxx.93.1 | ikeda |
| 2 | 172.xxx.93.102 | 2F ENTRANCE | iR-ADV_C0002 | 172.xxx.93.1 | ikeda |
| 3 | 172.xxx.93.181 | THIRD | LBS0001 | 172.xxx.93.1 | ikeda |
| 4 | 172.xxx.93.182 | SECOND | LBS0002 | 172.xxx.93.1 | tanaka |
| 5 | 172.xxx.93.183 | FIRST | LBS0001 | 172.xxx.93.1 | tanaka |
| 6 | 172.xxx.10.51 | BESIDE SATO | iR0001 | 172.xxx.10.1 | sato |
| 7 | 172.yyy.10.52 | BESIDE BOOKSHELF | LBS0001 | 172.yyy.10.1 | sato |
| 8 | 172.yyy.10.51 | MONOCHROME | iR0001 | 172.yyy.10.1 | tanaka |
| 9 | 172.yyy.10.52 | COLOR | LBS0001 | 172.yyy.10.1 | ikeda |

```
<AddBookMark>
        <Url>http://xxx.xxx.com/abcd/efgh/hijk/SaveScanMode_20100906161130/</Url>
        <Name>ScanMode_2010/09/06_16:11:30</Name>
</AddBookMark>
```

702

```
<DeleteBookMark>
        <Url>http://xxx.xxx.com/abcd/efgh/hijk/SaveScanMode_20100906161130/</Url>
        <Name>ScanMode_2010/09/06_16:11:30</Name>
</DeleteBoolMark>
```

703

```
<ScanToSend>
        <ScanMode>
                <Color>FullColor</Color>
                <Resolution>300x300</Resolution>
                <ScanSize>A4</ScanSize>
                <FileFormat>JPEG</FileFormat>
                <Density>+5</Density>
                        ~
        </ScanMode>
        <Address>yyy@xxx.xxx.com</Address>
</ScanToSend>
```

711

```
<DeleteScanMode>
        <Url>http://xxx.xxx.com/abcd/efgh/hijk/SaveScanMode_20100906161130/</Url>
</DeleteScanMode>
```

FIG. 6A 800

SELECT SCANNER.

| | IP ADDRESS | MODEL | COMMENT |
|---|---|---|---|
| ○ | 172.24.xxx.101 | iR-ADV_C0001 | OA ON WEST SIDE |
| ⦿ | 172.24.xxx.102 | iR-ADV_C0002 | 2F ENTRANCE |
| ○ | 172.24.xxx.181 | LBS0001 | THIRD |

803
802
801

804 — NEXT

FIG. 6B 810

SET SCANNING.

| MODEL | iR-ADV_C0002 |
|---|---|
| IP ADDRESS | 172.xxx.93.102 |
| COMMENT | 2F ENTRANCE |

| COLOR | MONOCHROME ▼ |
|---|---|
| RESOLUTION | 300 x 300 dpi ▼ |
| ORIGINAL SIZE | A4 ▼ |
| FILE FORMAT | JPEG ▼ |

811 — NEXT

FIG. 6C 820

SCAN SETTINGS ARE BEING STORED.

FIG. 6D 830

SCANNER SETTINGS HAVE BEEN STORED.
   iR-ADV_C0002

DESIGNATE FOLLOWING FAVORITE FROM BROWSER AT 172.xxx.93.102
2F ENTRANCE

ScanMode_2010/09/06_16:11:30

SCANNING...

FIG. 6F 850

SCANNING HAS ENDED.

851 — OK

F I G. 15

```
<Print>
        <PrintMode>
                <Count>2</Count>
                <PaperSize>A3</PaperSize>
                <Staple>LeftUpper</Staple>
                <TwoSide>YES</TwoSide>
                     ~
        </PrintMode>
        <Url>http://zzz.zzz.co.jp/abcd/efgh/ijkl</Url>
</Print>
```

1701

```
<DeletePrintMode>
        <Url>http://xxx.xxx.com/abcd/efgh/hijk/SavePrintMode_20100913124230/</Url>
</DeletePrintMode>
```

SELECT PRINTER.

| IP ADDRESS | MODEL | COMMENT |
|---|---|---|
| ○ 172.24.xxx.101 | iR-ADV_C0001 | OA ON WEST SIDE |
| ● 172.24.xxx.102 | iR-ADV_C0002 | 2F ENTRANCE |
| ○ 172.24.xxx.181 | LBS0001 | 15TH |

1803
1802
1801

1804 — NEXT

FIG. 16B 1810

SET PRINTING.

| MODEL | iR-ADV_C0002 |
| IP ADDRESS | 172.xxx.93.102 |
| COMMENT | 2F ENTRANCE |

| COPY COUNT | 2 ▼ |
| PAPER SIZE | A3 ▼ |
| STAPLE | UPPER LEFT ▼ |
| SCREEN | ON ▼ |

PRINT SETTINGS ARE BEING STORED.

FIG. 16D 1830

PRINT SETTINGS HAVE BEEN STORED.

iR-ADV_C0002

DESIGNATE FOLLOWING FAVORITE FROM BROWSER AT
172.xxx.93.102 2F ENTRANCE

PrintMode_2010/09/13_12:42:30

PRINTING...

FIG. 16F 1850

PRINTING HAS ENDED.

1851 — OK

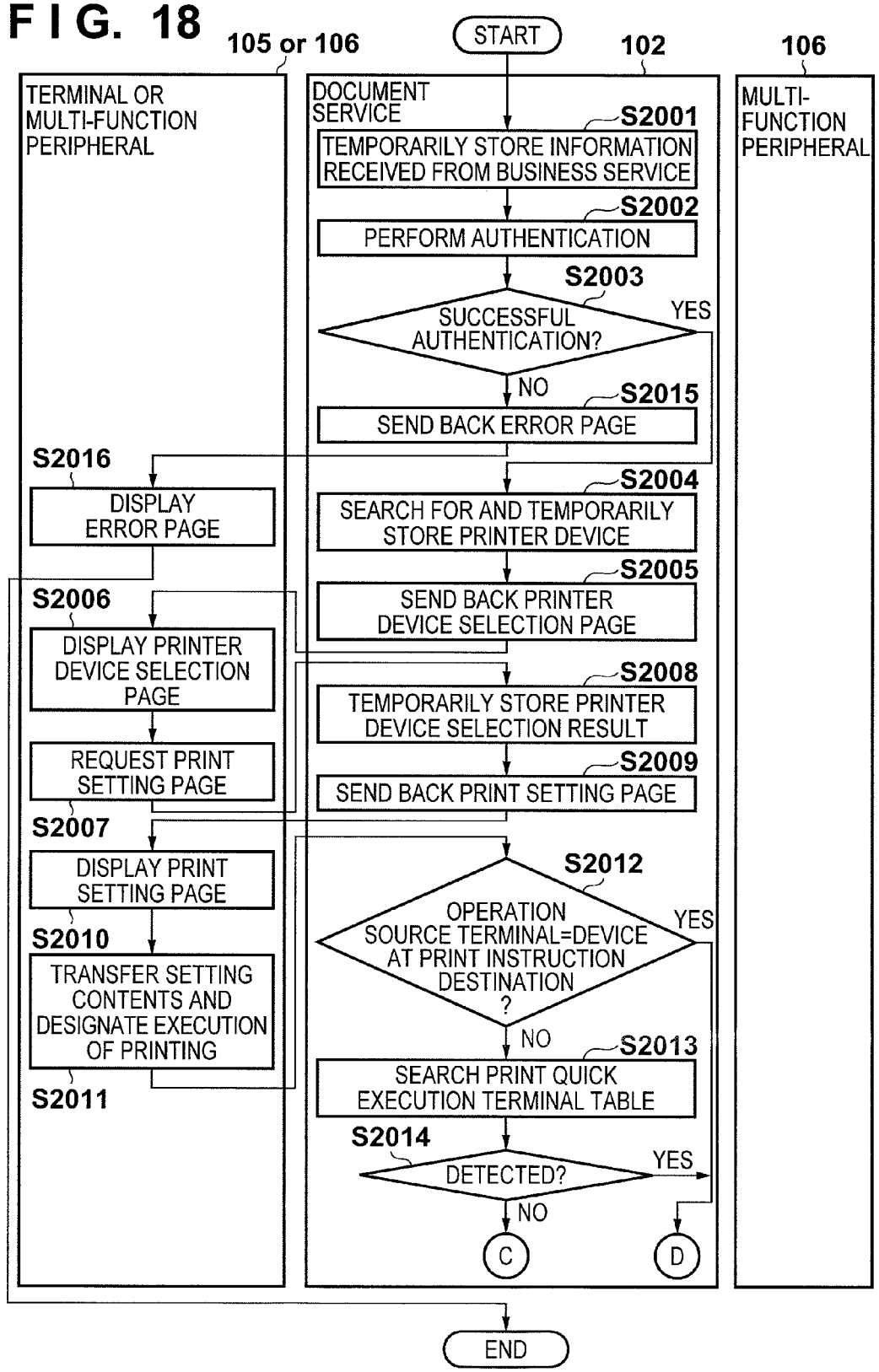

```
<ScanToSend>
    <ScanMode>
        <Color>FullColor</Color>
        <Resolution>300x300</Resolution>
        <ScanSize>A4</ScanSize>
        <FileFormat>JPEG</FileFormat>
        <Density>+5</Density>
        ~
    </ScanMode>
    <Address>yyy@xxx.xxx.com</Address>
    <From>172.xx.20.20</From>
    <User>
        <Name>ikeda</Name>
        <Password>xyzwv</Password>
    </User>
</ScanToSend>
```
2501

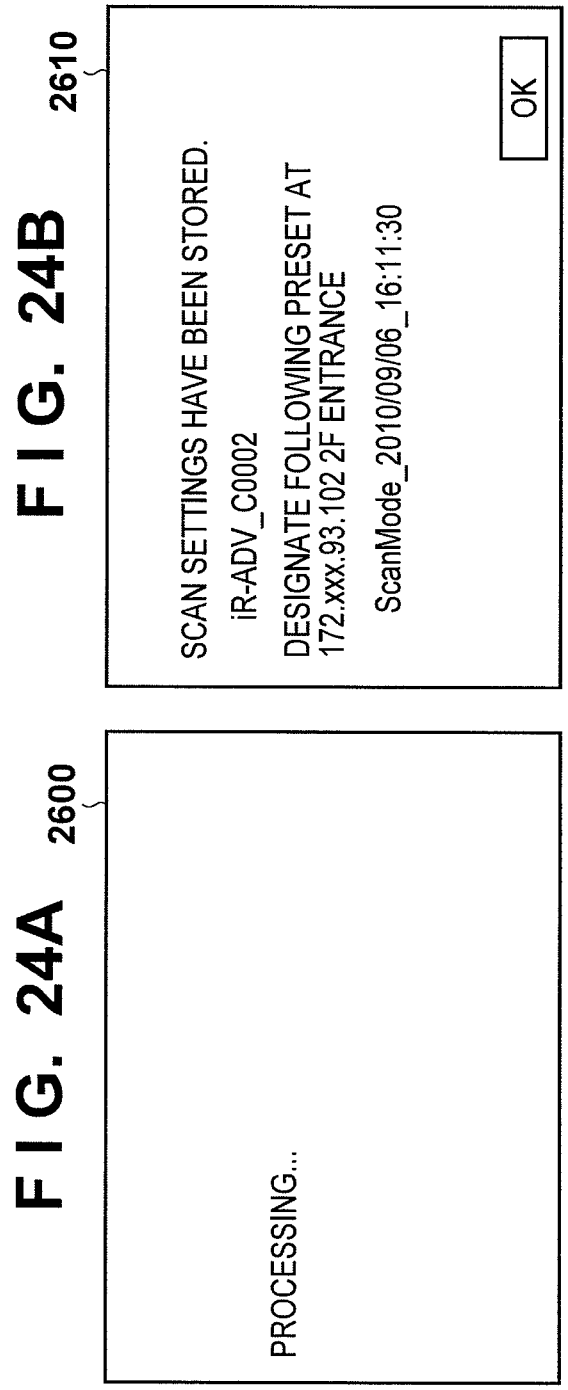

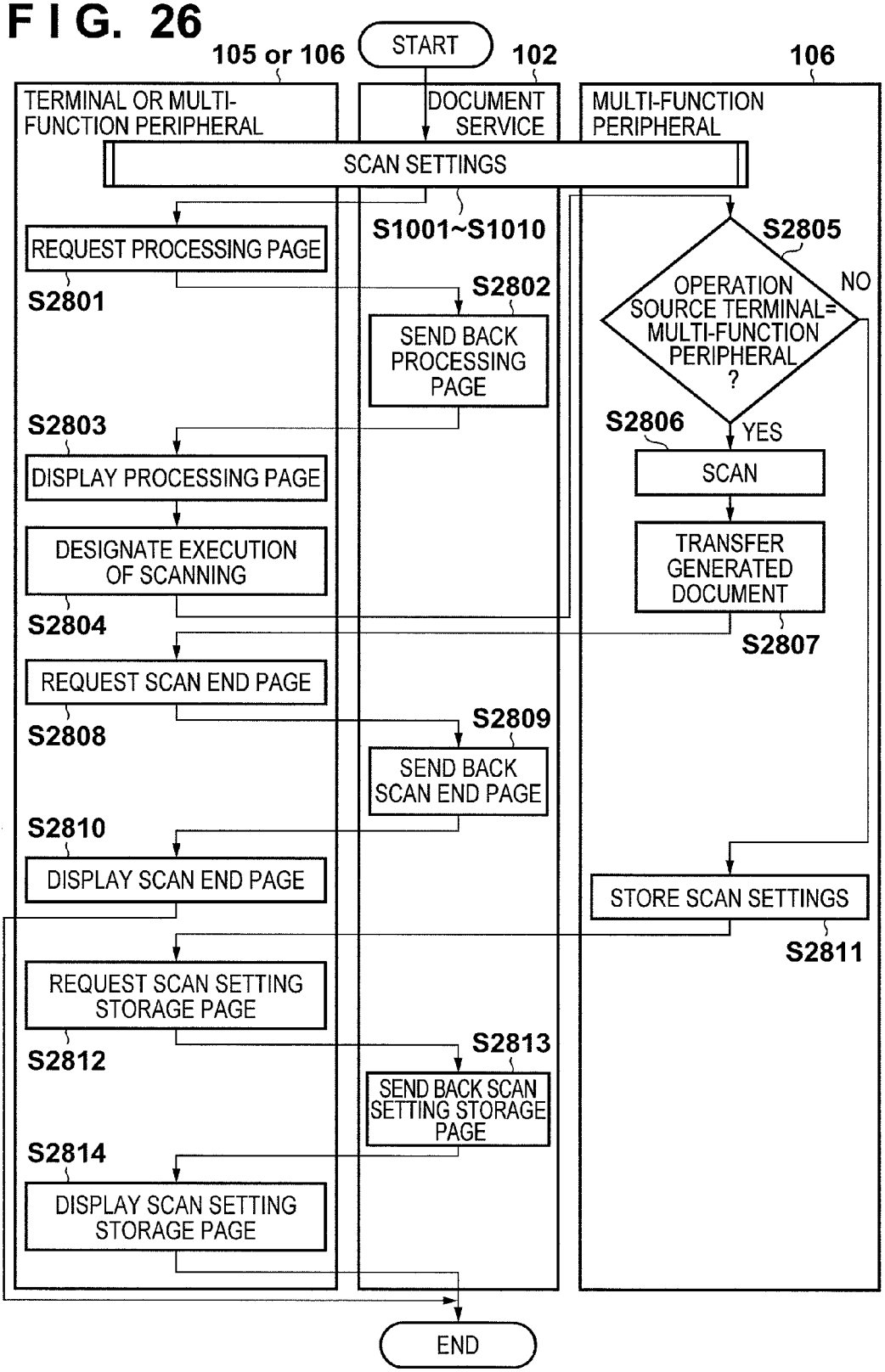

FIG. 28

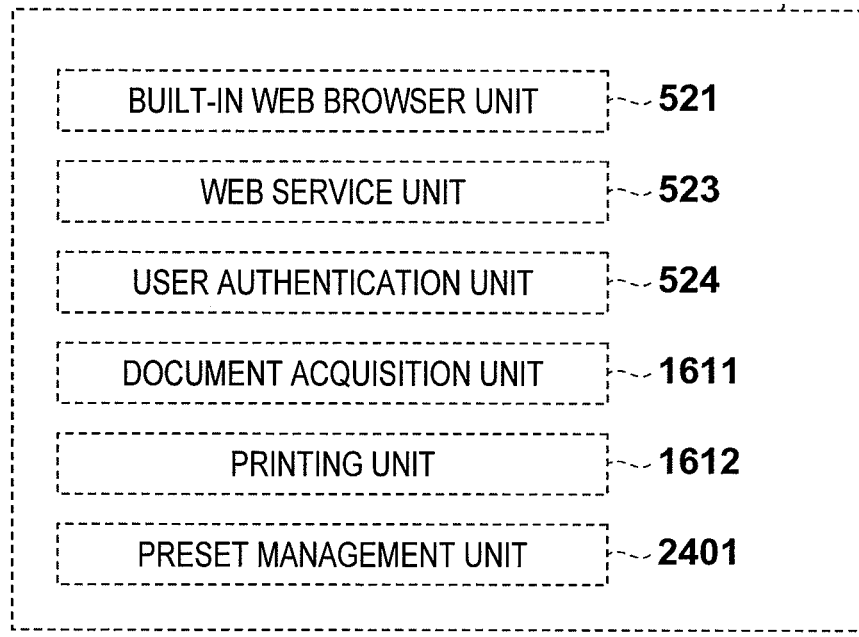

- BUILT-IN WEB BROWSER UNIT — 521
- WEB SERVICE UNIT — 523
- USER AUTHENTICATION UNIT — 524
- DOCUMENT ACQUISITION UNIT — 1611
- PRINTING UNIT — 1612
- PRESET MANAGEMENT UNIT — 2401

```
<Print>
    <PrintMode>
        <Count>2</Count>
        <PaperSize>A3</PaperSize>
        <Staple>LeftUpper</Staple>
        <TwoSide>YES</TwoSide>
            ~
    </PrintMode>
    <Url>http://zzz.zzz.co.jp/abcd/efgh/ijkl</Url>
    <From>172.xx.20.20</From>
    <User>
        <Name>ikeda</Name>
        <Password>zyxwv</Password>
    </User>
</Print>
```

F I G. 30

3200

SCAN SETTINGS HAVE BEEN STORED.
    iR-ADV_C0002
DESIGNATE FOLLOWING PRESET AT
172.xxx.93.102 2F ENTRANCE
    PrintMode_2010/09/06_12:42:30

OK

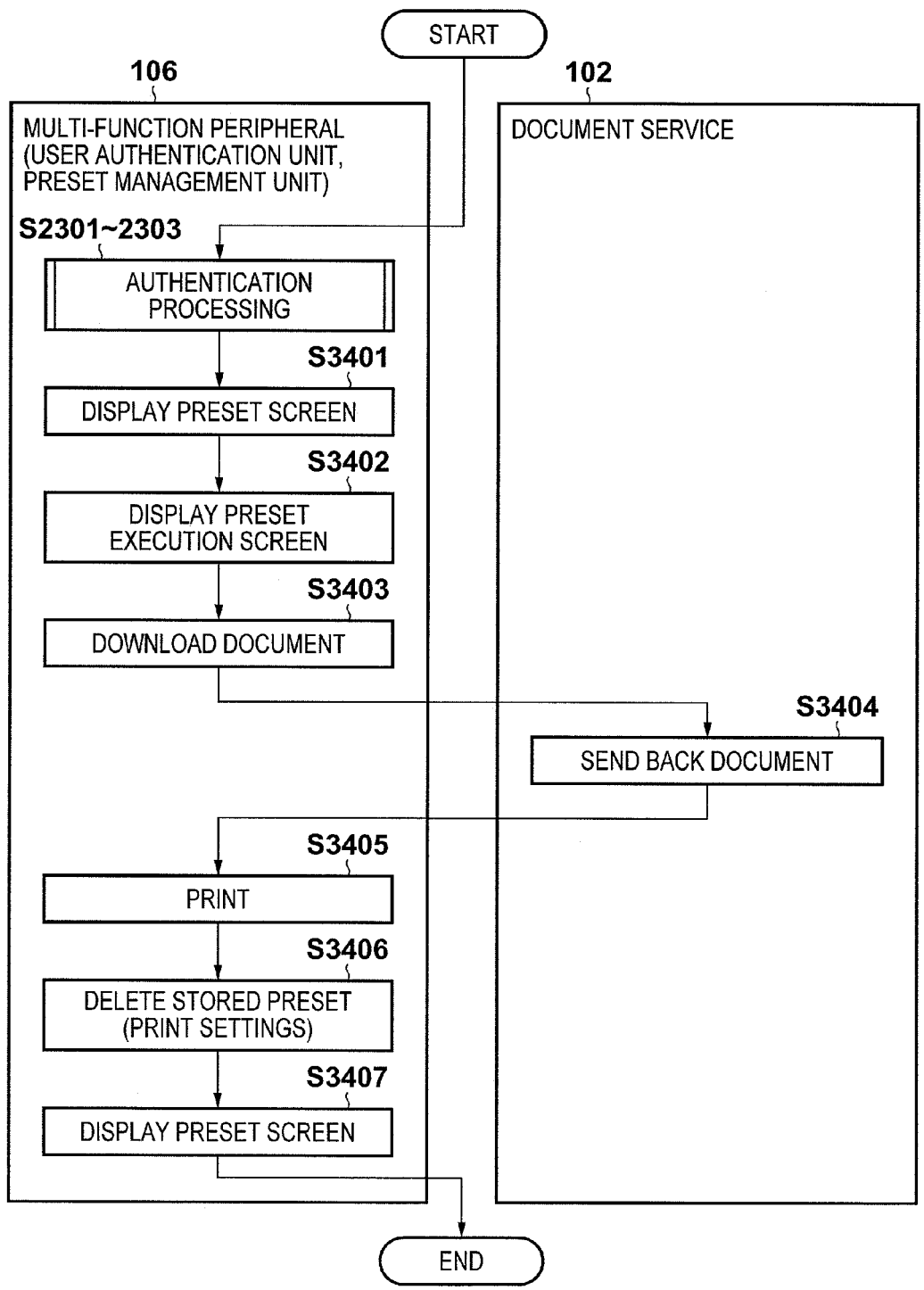

SCANNING SYSTEM, PRINTING SYSTEM, SERVICE PROVIDING SYSTEM, AND CONTROL METHOD

BACKGROUND OF THE INVENTION

1. Field of the Invention

The present invention relates to a scanning system including a scan service on the Internet and a scanner device on a local network.

The present invention also relates to a printing system including a print service on the Internet and a printing device on a local network.

2. Description of the Related Art

High-speed, large-capacity networks, and SaaS (Software as a Service) which provides a software function as a service on the Internet to reduce the cost of office information infrastructures and the like are becoming widespread. Conventionally, a system built on a local network in an office and the like for the purpose of business support and the like is provided as a service on the Internet. Such a service will be called a "business service".

Even a printing system which has conventionally been built on a local network in an office or the like is being provided as a service on the Internet. This service manages devices such as a multi-function peripheral and printer on a local network, and print jobs generated by these devices. A device having a print function such as a multi-function peripheral or printer will be called a "printer device". A device having a scan function such as a multi-function peripheral or scanner will be called a "scanner device". Further, a multi-function peripheral, printer, or scanner will be generically called a "device". A service which manages such a device on a local network in cooperation with the device will be called a "document service".

The business service and document service can cooperate with each other. A document created by the business service can be printed by a printer device on a local network via the document service.

In terms of security, a firewall is set between a local network and the Internet, and inhibits the document service on the Internet from directly accessing a device on the local network. Hence, the document service issues an instruction to a device according to the following configuration/order.

(1) The user displays a web page provided by the document service on a web browser running on a PC on a local network.

(2) The user operates the web browser to set a function (for example, printing or scanning) to be executed by a device. When the user designates execution, the setting contents and execution instruction are transferred from the web browser to the document service.

(3) The document service generates a response containing a managed/stored device address and a redirect instruction to the address, and transfers it to the web browser. At this time, information to be redirected by the redirect instruction contains the setting contents and execution instruction.

(4) The web browser redirects, to the device address, the response received from the document service.

(5) The device receives the redirected response. The device executes processing according to the received setting contents.

In the above-described processing sequence, for print processing, information to be redirected in step (3) contains even position information (for example, URL (Uniform Resource Locator)) of a document to be printed. In step (5), the printer device downloads the document to be printed, based on the position information, and prints it (pull print).

In addition, the document service can provide a device UI customization unit. Recent devices incorporate a web browser, similar to a PC. A web browser running on the PC will be simply referred to as a "web browser", and a web browser running on the device will be referred to as a "built-in web browser". The document service generates a web page for providing pre-defined operability apposite for each user, and transfers it to the device. The device displays this web page on the built-in web browser and can provide a customized UI. In this case, operation instructions are issued from the document service to the device in the same order as that of (1) to (5) described above.

Recently, the document service needs to cope with not only printing but also scanning. More specifically, a scanner device on a local network scans an original to generate an electronic document (to be referred to as a "document") via the document service. In cooperation with the business service, the generated document is transferred to the business service.

When the user issues a scan instruction to the scanner device from a remote terminal such as a PC, the scanner device may scan an original he does not want, because he is not present near the scanner device. Examples of this problem are as follows:

When the user designates scanning from the PC, the scanner device may scan an original another user forgot to pick up.

Before the user gets back to the PC and designates scanning after setting an original on the scanner device, another user may replace the original.

To solve this problem, there is proposed a method of permitting a scan instruction to the scanner device only from the operation unit of the scanner device main body (see, for example, Japanese Patent Laid-Open No. 8-265498).

According to the conventional technique, a scan instruction from the web browser of a PC is a remote scan instruction and thus cannot be executed. In cooperation with the business service, it is necessary to use the business service on the web browser of a PC, and perform scanning by the document service on the built-in web browser of a scanner device. Since cooperation between the two services is physically cut, the user needs to designate these services cumbersomely by inputting information which associates them. For example, the user needs to designate communication between the two services using a communication ID generated upon a call for the document service from the business service, or specify a transfer destination using a destination to the business service to which a scanned document is transferred.

There is also a need to operate a customized device UI from the web browser of a PC via the document service because of the following two reasons:

The PC includes a large screen, mouse, and keyboard, and is sometimes more convenient than the operation unit of the device.

The device is shared in an office. However, when the user operates and occupies the device in front of it, he may feel a psychological burden such as consideration to other users.

However, the conventional technique inhibits scanning from the web browser of a PC.

When the user issues a print instruction to the printer device from a remote terminal such as a PC, sheets may be left or carried away because he is not present near the printer device. To solve this, a print instruction to the printer device may be permitted only from the operation unit of the printer device main body. However, this method has the same problems as the above-described problems of scanning.

SUMMARY OF THE INVENTION

According to one aspect of the present invention, there is provided a scanning system comprising a scan server, scanner device, and terminal which are connected to a network, the scanner device including: a first instruction unit configured to transfer a scan processing setting and a start instruction to the scan server; an execution unit configured to receive a scan processing setting and a start instruction from the scan server and to execute scan processing; and a memory unit configured to store identification information that is issued by the scan server and to indicate the scan processing setting, the terminal including a second instruction unit configured to transfer a scan processing setting and a start instruction to the scan server, and the scan server including: a reception unit configured to receive the scan processing setting and the start instruction from one of the first instruction unit and the second instruction unit; a storage unit configured to store the scan processing setting received by the reception unit and to issue the identification information; a determination unit configured to determine which of the first instruction unit and the second instruction unit has transferred the scan processing setting and start instruction received by the reception unit; and a processing unit configured, when the determination unit determines that the first instruction unit has transferred the scan processing setting and the start instruction, to transfer the scan processing setting and the start instruction to the scanner device, and when the determination unit determines that the second instruction unit has transferred the scan processing setting and the start instruction, to cause the storage unit to store the scan processing setting and to transfer, to the scanner device, identification information indicating the stored scan processing setting.

According to another aspect of the present invention, there is provided a printing system comprising a print server, printer device, and terminal which are connected to a network, the printer device including: a first instruction unit configured to transfer a print processing setting and a start instruction to the print server; an execution unit configured to receive a print processing setting and a start instruction from the print server and to execute print processing; and a memory unit configured to store identification information that is issued by the print server and indicates the print processing setting, the terminal including a second instruction unit configured to transfer a print processing setting and a start instruction to the print server, and the print server including: a reception unit configured to receive the print processing setting and the start instruction from one of the first instruction unit and the second instruction unit; a storage unit configured to store the print processing setting received by the reception unit and to issue the identification information; a determination unit configured to determine which of the first instruction unit and the second instruction unit has transferred the print processing setting and start instruction received by the reception unit; and a processing unit configured, when the determination unit determines that the first instruction unit has transferred the print processing setting and the start instruction, to transfer the print processing setting and the start instruction to the printer device, and when the determination unit determines that the second instruction unit has transferred the print processing setting and the start instruction, to cause the storage unit to store the print processing setting and to transfer, to the printer device, identification information indicating the stored print processing setting.

According to another aspect of the present invention, there is provided a scanning system comprising a scan server, scanner device, and terminal which are connected to a network, the terminal including a second instruction unit configured to transfer a scan processing setting and a start instruction via the scan server, and the scanner device including: a first instruction unit configured to transfer a scan processing setting and a start instruction via the scan server; a reception unit configured to receive a scan processing setting and a start instruction from the scan server; an execution unit configured to execute scan processing based on the scan processing setting received by the reception unit; a storage unit configured to store the scan processing setting received by the reception unit; and a determination unit configured to determine which of the first instruction unit and the second instruction unit has transferred the scan processing setting and start instruction received by the reception unit, wherein when the determination unit determines that the first instruction unit has transferred the scan processing setting and the start instruction, the execution unit executes scan processing, and when the determination unit determines that the second instruction unit has transferred the scan processing setting and the start instruction, the storage unit stores the scan processing setting.

According to another aspect of the present invention, there is provided a printing system comprising a print server, printer device, and terminal which are connected to a network, the terminal including a second instruction unit configured to transfer a print processing setting and a start instruction via the print server, and the printer device including: a first instruction unit configured to transfer a print processing setting and a start instruction via the print server; a reception unit configured to receive a print processing setting and a start instruction from the print server; an execution unit configured to execute print processing based on the print processing setting received by the reception unit; a storage unit configured to store the print processing setting received by the reception unit; and a determination unit configured to determine which of the first instruction unit and the second instruction unit has transferred the print processing setting and start instruction received by the reception unit, wherein when the determination unit determines that the first instruction unit has transferred the print processing setting and the start instruction, the execution unit executes print processing, and when the determination unit determines that the second instruction unit has transferred the print processing setting and the start instruction, the storage unit stores the print processing setting.

According to another aspect of the present invention, there is provided a service providing system comprising a server, device, and terminal which are connected to a network, the device including: a first instruction unit configured to transfer a processing setting and a start instruction in a provided service to the server; an execution unit configured to receive a processing setting and a start instruction from the server and to execute processing; and a memory unit configured to store identification information that is issued by the server and indicates the processing setting, the terminal including a second instruction unit configured to transfer a processing setting and a start instruction to the server, and the server including: a reception unit configured to receive the processing setting and the start instruction from one of the first instruction unit and the second instruction unit; a storage unit configured to store the processing setting received by the reception unit and to issue the identification information; a determination unit configured to determine which of the first instruction unit and the second instruction unit has transferred the processing setting and start instruction received by the reception unit; and a processing unit configured, when the determination unit determines that the first instruction unit has transferred the processing setting and the start instruction, to transfer the processing setting and the start instruction to the device, and when the determination unit determines that the second instruction unit has transferred the processing setting and the start instruction, to cause the storage unit to store the processing setting and to transfer, to the device, identification information indicating the stored processing setting.

According to another aspect of the present invention, there is provided a service providing system comprising a server, device, and terminal which are connected to a network, the terminal including a second instruction unit configured to transfer a processing setting and a start instruction in a provided service via the server, and the device including: a first instruction unit configured to transfer a processing setting and a start instruction via the server; a reception unit configured to receive a processing setting and a start instruction from the server; an execution unit configured to execute processing based on the processing setting received by the reception unit; a storage unit configured to store the processing setting received by the reception unit; and a determination unit configured to determine which of the first instruction unit and the second instruction unit has transferred the processing setting and start instruction received by the reception unit, wherein when the determination unit determines that the first instruction unit has transferred the processing setting and the start instruction, the execution unit executes processing, and when the determination unit determines that the second instruction unit has transferred the processing setting and the start instruction, the storage unit stores the processing setting.

According to another aspect of the present invention, there is provided a control method in a scanning system including a scan server, scanner device, and terminal which are connected to a network, comprising: in the scanner device, a first instruction step of transferring a scan processing setting and a start instruction to the scan server; an execution step of receiving a scan processing setting and a start instruction from the scan server and executing scan processing; and a memory step of storing, in a memory unit, identification information that is issued by the scan server and indicates the scan processing setting, in the terminal, a second instruction step of transferring a scan processing setting and a start instruction to the scan server, and in the scan server, a reception step of receiving the scan processing setting and the start instruction in one of the first instruction step and the second instruction step; a storage step of storing, in a memory unit, the scan processing setting received in the reception step and issuing the identification information; a determination step of determining in which of the first instruction step and the second instruction step, the scan processing setting and start instruction received in the reception step have been transferred; and a processing step of, when the scan processing setting and the start instruction are determined in the determination step to have been transferred in the first instruction step, transferring the scan processing setting and the start instruction to the scanner device, and when the scan processing setting and the start instruction are determined in the determination step to have been transferred in the second instruction step, storing the scan processing setting in the memory unit and transferring, to the scanner device, identification information indicating the stored scan processing setting.

According to another aspect of the present invention, there is provided a control method in a printing system including a print server, printer device, and terminal which are connected to a network, comprising: in the printer device, a first instruction step of transferring a print processing setting and a start instruction to the print server; an execution step of receiving a print processing setting and a start instruction from the print server and executing print processing; and a memory step of storing, in a memory unit, identification information that is issued by the print server and indicates the print processing setting, in the terminal, a second instruction step of transferring a print processing setting and a start instruction to the print server, and in the print server, a reception step of receiving the print processing setting and the start instruction in one of the first instruction step and the second instruction step; a storage step of storing, in a memory unit, the print processing setting received in the reception step and issuing the identification information; a determination step of determining in which of the first instruction step and the second instruction step, the print processing setting and start instruction received in the reception step have been transferred; and a processing step of, when the print processing setting and the start instruction are determined in the determination step to have been transferred in the first instruction step, transferring the print processing setting and the start instruction to the printer device, and when the print processing setting and the start instruction are determined in the determination step to have been transferred in the second instruction step, storing the print processing setting in the memory unit and transferring, to the printer device, identification information indicating the stored print processing setting.

While preventing scanning of an original the user does not want, setting and designation of scanning from the document service can be performed from even the web browser of a PC. Set contents can be stored, and easily displayed and executed from the built-in web browser of a scanner device, improving user friendliness. Even cooperation with the business service becomes easy.

For an operation from the built-in web browser of a multifunction peripheral, scanning is executed quickly without storing set contents, so no customized UI function is impaired.

When printing by a printer device via the document service, contents set on the web browser of a PC are stored, and printing is executed by an operation from the built-in web browser of the printer device. This can prevent sheets from being left or lost, and enhance security.

Further features of the present invention will become apparent from the following description of exemplary embodiments (with reference to the attached drawings).

BRIEF DESCRIPTION OF THE DRAWINGS

FIG. 1 is a block diagram showing the schematic configuration of a scanning system;

FIG. 4 is a table exemplifying the structure of a scanner device information table;

FIG. 5 is a schematic view exemplifying a data format;

FIGS. 6A, 6B, 6C, 6D, 6E, and 6F are views showing display examples of screens;

FIG. 15 is a schematic view exemplifying a data format;

FIGS. 16A, 16B, 16C, 16D, 16E, and 16F are views showing display examples of screens;

FIG. 18 is a flowchart showing a print processing sequence;

FIGS. 24A and 24B are views showing display examples of screens;

FIG. 26 is a flowchart showing a scan processing sequence according to the fourth embodiment;

FIG. 28 is a block diagram showing the schematic logical configuration of a multi-function peripheral according to the fifth embodiment;

FIG. 29 is a schematic view exemplifying a data format;

FIG. 30 is a view showing a display example of a screen;

FIG. 32 is a flowchart showing a print processing sequence in the multi-function peripheral.

DESCRIPTION OF THE EMBODIMENTS

First Embodiment

Figure 2A:
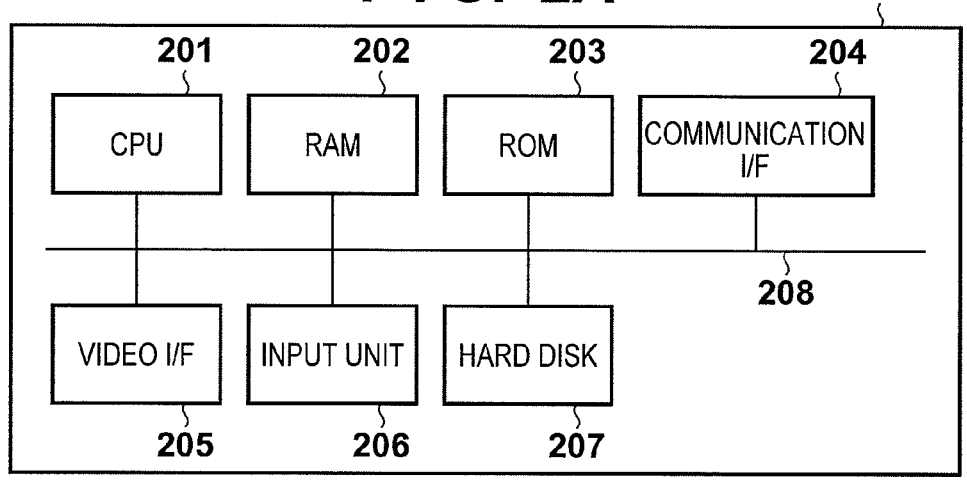
FIGS. 2A, 2B, and 2C are block diagrams showing the schematic physical configurations of respective apparatuses.

The first embodiment of the present invention will now be described with reference to the accompanying drawings. The first embodiment will explain a method in which a document service executes scanning using a scanner device on a local network in response to a scan request from a business service.

<Description of Configuration>

(System Configuration)

FIG. 1 is a block diagram showing the configuration of a scanning system in the first embodiment. A business service 101 provides functions such as customer management and in-house business support, and is a service built as SaaS on the Internet. Similar to the business service 101, a document service 102 is a service built as SaaS on the Internet. The document service 102 manages a document on a local network. Also, the document service 102 provides a customized UI to the device. The business service 101 and document service 102 generate web pages in accordance with requests, and transfer them to a terminal 105 and multi-function peripheral 106. The terminal 105 and multi-function peripheral 106 display web pages received from the web browser and built-in web browser. The user can refer to and operate functions provided by the business service 101 and document service 102. When executing scanning, the business service 101 requests it of the document service 102.

A local network 103 is, for example, a local network in an office. In the embodiment, the terminal 105 such as a PC, and the multi-function peripheral 106 are connected to the local network 103. The local network 103, business service 101, and document service 102 are connected via the Internet 104. Note that a firewall (not shown) is set between the Internet 104 and the local network 103. The firewall inhibits the document service 102 from directly accessing the multi-function peripheral 106. Assume that a device on the local network 103 can directly access each service on the Internet 104.

The multi-function peripheral 106 serves as a print device having a print function, and can receive a document from an external device and print it. In addition, the multi-function peripheral 106 serves as a scanner device having a scan function, and can scan an original to generate a document and can transfer the document to an external device. Note that an operation terminal other than the terminal 105, and a device such as a printer or scanner other than the multi-function peripheral 106 can be connected to the local network 103. In the embodiment, only the multi-function peripheral 106 is described as a printer device and scanner device for descriptive convenience. However, another device such as a printer may be applied as a printer device. Also, another device such as a scanner may be applied as a scanner device.

The business service 101 and document service 102 may be implemented by a physically single apparatus. The business service 101 can also be a business service device or business server as a physical apparatus. Even the document service 102 can be a document service device or document server. In accordance with the function, a scan server or print server can also be adopted.

(Physical Configuration)

The physical configurations of the document service 102, terminal 105, and multi-function peripheral 106 will be explained. FIG. 2A is a block diagram showing the physical configuration of the document service 102. A CPU 201, RAM 202, ROM 203, communication I/F 204, video I/F 205, input unit 206 (for example, keyboard and mouse), and hard disk 207 are connected to each other via a system bus 208.

The CPU 201 performs calculation and hardware control based on an operating system (OS) and an application program (for example, document service program in the present invention). The RAM 202 is a memory unit which serves as a work area for the CPU 201 and stores various data. The ROM 203 stores a so-called BIOS and the like for controlling input/output of data to/from the hard disk 207 and the like in cooperation with the OS. The communication I/F 204 cooperates with the communication program of the OS executed by the CPU 201. The communication I/F 204 communicates with an external apparatus connected via a network to exchange various data.

The video I/F 205 outputs display data to a display device to display it. The input unit 206 is used to input an instruction to the document service 102. The hard disk 207 stores an OS, application programs, and the like.

Figure 2B:
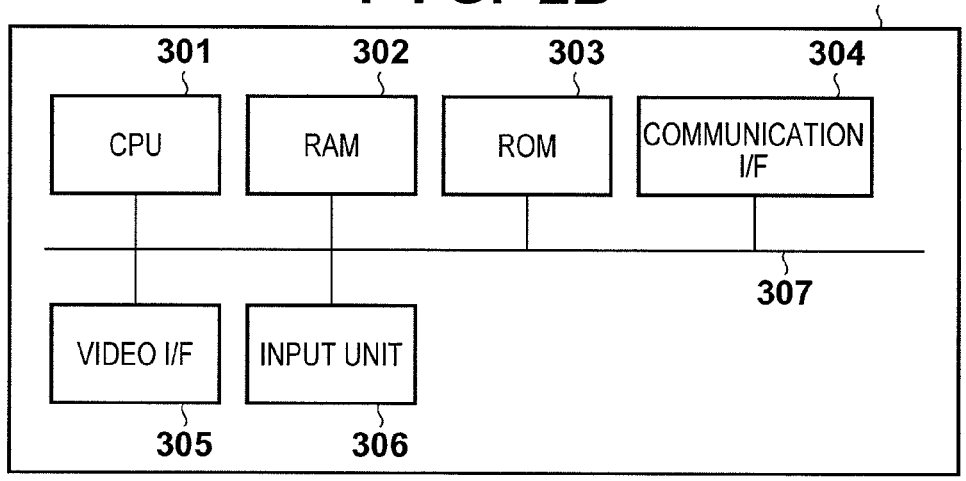

FIG. 2B is a block diagram showing the physical configuration of the terminal 105. A CPU 301, RAM 302, ROM 303, communication I/F 304, video I/F 305, and input unit (for example, keyboard and mouse) 306 are connected to each other via a system bus 307.

The CPU 301 performs calculation and hardware control based on an OS program and an application program (for example, web browser program in the present invention). The RAM 302 serves as a work area for the CPU 301 and stores various data. The ROM 303 stores an OS, web browser program, and the like.

The communication I/F 304 cooperates with the communication program of the OS executed by the CPU 301. The communication I/F 304 communicates with an external apparatus connected via a network to exchange various data. The video I/F 305 outputs display data to a display device to display it. The input unit 306 is used to input an instruction to the terminal 105.

Figure 2C:
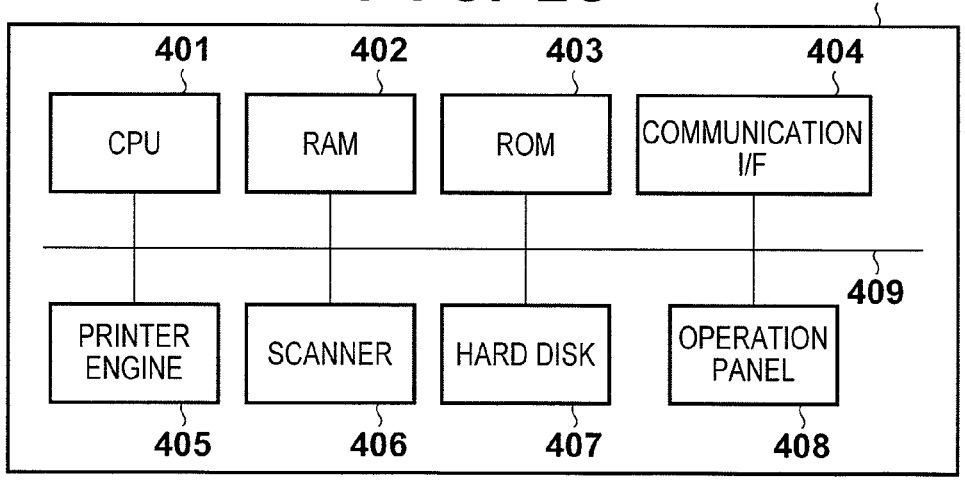

FIG. 2C is a block diagram showing the physical configuration of the multi-function peripheral 106. A CPU 401, RAM 402, ROM 403, communication I/F 404, printer engine 405, scanner 406, hard disk 407, and operation panel 408 are connected to each other via a system bus 409. The CPU 401 performs calculation and hardware control based on a controller program (for example, a control program for the multi-function peripheral in the embodiment, including a built-in web browser program). The RAM 402 serves as a work area for the CPU 401 and stores various data. The ROM 403 stores a so-called BIOS and the like for controlling input/output of data to/from the hard disk 407 and the like.

The communication I/F 404 cooperates with a controller program executed by the CPU 401. The communication I/F 404 communicates with an external apparatus connected via a network to exchange various data. The printer engine 405 cooperates with a controller program executed by the CPU 401. The CPU 401 receives PDL (Page Description Language) data from an external device via the communication I/F 404. Alternatively, the CPU 401 downloads PDL data from an external device. Then, the CPU 401 electrically processes the acquired PDL data, decomposing it into cyan (C), magenta (M), yellow (Y), and black (Bk) components. The CPU 401 supplies these components as image signals to the printer engine 405 to print.

The scanner 406 scans an original of paper or the like using an optical reading device (not shown) such as a CCD (Charge Coupled Device), and converts the original image information into electrical signal data. The hard disk 407 stores a controller program and the like. The operation panel 408 is formed from a touch panel, display, or the like, and can receive a user instruction and display data.

(Logical Configuration)

Figure 3:
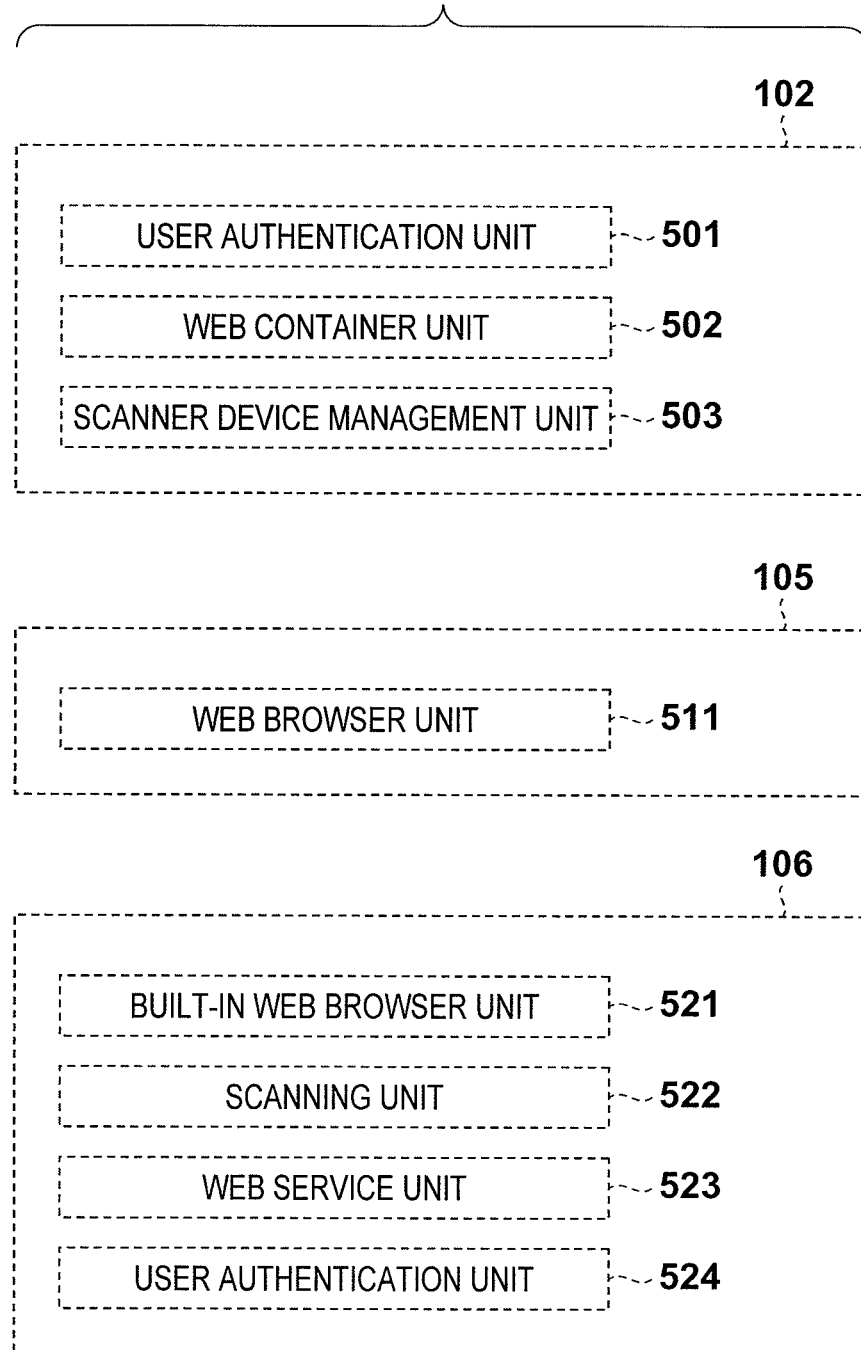
FIG. 3 is a block diagram showing the schematic logical configurations of the respective apparatuses.

FIG. 3 is a block diagram showing the schematic logical configurations of the document service 102, terminal 105, and multi-function peripheral 106.

In the document service 102, the CPU 201 can move an OS and application program stored in the hard disk 207 to the RAM 202 (store them in the RAM 202). Upon completion of the movement, the CPU 201 becomes ready to execute the application program.

The document service 102 includes the following logical building components. The following building components are implemented by executing an application program by the CPU 201. Also, these building components are implemented using the CPU 201 and the RAM 202 (area where the application program is stored and an area where information obtained upon executing the application program by the CPU 201 is stored).

A user authentication unit 501 authenticates a user. User information itself is managed by another service (authentication service: not shown). Even user authentication processing is executed by the authentication service. The user authentication unit 501 executes authentication by transferring authentication-requested user information to the authentication service and receiving the authentication result for the user information. Similarly, the business service 101 assigns authentication processing to the authentication service. Hence, authentication information is shared between the business service 101 and the document service 102 and inherited in communication, reducing the load of the user authentication operation.

A web container unit 502 generates a web page. The web container unit 502 receives a web page request from the business service 101, terminal 105, or multi-function peripheral 106 via the communication I/F 204. The web container unit 502 sends back the generated web page as a response. The web container unit 502 receives calls for various web services (to be described later) via the communication I/F 204, and executes them. A scanner device management unit 503 stores and manages scanner device information.

In the terminal 105, the CPU 301 can move an OS and application program stored in the ROM 303 to the RAM 302 (store them in the RAM 302). Upon completion of the movement, the CPU 301 becomes ready to execute the application program.

The terminal 105 includes the following logical building components. The following building components are implemented by executing an application program by the CPU 301. Also, these building components are implemented using the CPU 301 and an area of the RAM 302 where the application program is stored and an area (of the RAM 302) where information obtained upon executing the application program by the CPU 301 is stored.

A web browser unit 511 converts a web page generated by the web container unit 502 of the document service 102 into display data. The web browser unit 511 displays the display data on the display via the video I/F 305.

In the multi-function peripheral 106, the CPU 401 can move a controller program stored in the hard disk 407 to the RAM 402 (store it in the RAM 402). Upon completion of the movement, the CPU 401 becomes ready to execute the controller program.

The multi-function peripheral 106 includes the following logical building components. The following building components are implemented by executing a controller program by the CPU 401. Also, these building components are implemented using the CPU 401 and areas of the RAM 402.

A built-in web browser unit 521 converts a web page generated by the web container unit 502 of the document service 102 into display data. The built-in web browser unit 521 displays the display data on the operation panel 408. The built-in web browser unit 521 stores and manages URLs serving as "favorite" web page request destinations, and names representing them. The built-in web browser unit 521 requests a web page at a favorite URL, and displays it. Favorites are managed for each user authenticated by a user authentication unit 524. Only favorites of an authentication user can be displayed.

A scanning unit 522 controls the scanner 406 to scan an original and generate a document. A web service unit 523 receives calls for various web services (to be described later) via the communication I/F 404, and executes the web services. The user authentication unit 524 performs user authentication. Similar to the user authentication unit 501 of the document service 102, user information itself is managed by another service (authentication service: not shown). Similar to the document service 102, authentication processing is assigned to the authentication service.

(Scanner Device Information Managed by Document Service)

FIG. 4 is a table showing the format of data representing scanner device information managed by the scanner device management unit 503 of the document service 102. A scanner device information table 600 is a data table which stores scanner information. One record (row) indicates one scanner device registered by a given user.

An ID data item 601 is a data item for uniquely identifying a record in the scanner device information table 600. An IP address data item 602 is a data item representing the IP address of a scanner device on a local network. A comment data item 603 is a data item representing a character string arbitrarily registered by the user. The registered character string is a comment on a corresponding scanner device. A model code data item 604 is a data item representing information for identifying a scanner device model.

A global address data item 605 is a data item representing a global address assigned to a local network to which a target scanner belongs. The document service 102 is a service on the Internet, and information about scanners on a plurality of local networks is registered. Of these scanners, scanners which belong to different local networks may have the same IP address on their local networks. To discriminate these scanners, the local networks themselves need to be identified, so the global address data item 605 is managed. That is, the local addresses of scanners in local networks designated by respective global addresses are registered not to overlap each other.

A user name data item 606 is data representing the name of a user who has registered a target scanner in the document service 102. The scanner device management unit 503 manages a scanner device for each user.

(Document Service and Web Service of Multi-function Peripheral)

FIG. 5 is a schematic view showing the formats of data received by the web container unit 502 of the document service 102 and the web service unit 523 of the multi-function peripheral 106. The web container unit 502 of the document service 102 receives a processing execution instruction from an external device. The web service unit 523 of the multi-function peripheral 106 receives a processing execution instruction from an external device. These execution instructions are received as messages in the SOAP format using HTTP as a wire protocol. In the following messages, the SOAP header and HTTP header are omitted.

A message 701 contains settings used in a web service which causes the built-in web browser unit 521 of the multi-function peripheral 106 to add a favorite. The message 701 is formed from an AddBookMark tag and contains the following pieces of information as parameters:

URL (Url tag) to be added to a favorite favorite name (Name tag)

A message 702 contains settings used in a web service which causes the built-in web browser unit 521 of the multi-function peripheral 106 to delete a favorite. This web service deletes a favorite having a matching URL and name from currently registered favorites. The message 702 is formed from a DeleteBookMark tag and contains the following pieces of information as parameters:

URL (Url tag) of a favorite to be deleted favorite name (Name tag)

A message 703 contains settings used in a web service which causes the multi-function peripheral 106 to execute scanning and transfer. This web service executes scanning at designated settings, and transfers the generated document to a designated destination by e-mail. The message 703 is formed from a ScanToSend tag and contains the following pieces of information as parameters:

various scan settings (Color, Resolution, ScanSize, FileFormat, and Density tags below a ScanMode tag)

transfer destination (Address tag)

A message 711 contains settings used in a web service which causes the document service 102 to delete stored scan settings. The message 711 is formed from a DeleteScanMode tag and contains, as a parameter, a URL (Url tag) indicating scan settings to be deleted.

The structures of the messages used in the embodiment have been described. However, the messages are not limited to these structures and may contain other parameters in accordance with compatible settings.

(Example of Screen)

Web pages displayed by the web browser unit 511 of the terminal 105 and the built-in web browser unit 521 of the multi-function peripheral 106, and screens displayed by the user authentication unit 524 and built-in web browser unit 521 will be explained with reference to screen views. The web browser unit 511 of the terminal 105 analyzes a web page to generate display data, and outputs the display data to the display via the video I/F 305. The user can perform an operation (input or instruction) via the input unit 306 for the display contents. The built-in web browser unit 521 of the multi-function peripheral 106 can analyze a web page to generate display data and display it on the operation panel 408. The user can perform an operation (input or instruction) via the operation panel 408 for the display contents.

(Display Example of Web Page)

FIGS. 6A to 6F are views showing display examples of web pages representing setting and execution of scanning. When the user designates scanning on a web page (not shown) provided by the business service 101, the web page changes to a web page 800 (scanner device selection page) shown in FIG. 6A to select a scanner device. At this time, the business service 101 redirects a web page request to the document service 102. The business service 101 transfers the following pieces of information to the document service 102:

user information: user information of a user currently authenticated by the business service 101 destination information: destination indicating the transfer destination of a document generated by scanning return destination URL: URL indicating a destination to which a web page request is redirected from the document service 102 to the business service 101 after printing The web page 800 is used to select a scanner device to execute scanning from scanner devices registered in the scanner device information table 600. The web page 800 displays a list of scanner devices belonging to the same local network as that of a device which displays the web page, out of scanner devices stored in the document service 102 in association with a currently authenticated user. In the display example shown in FIG. 6A, three scanner devices are displayed as choices.

Radio buttons 801, 802, and 803 display a scanner device selection state based on the user input result. When the user selects a Next button 804, the web page 800 changes to a web page 810 (scan setting page) shown in FIG. 6B. The web page 810 is used to make scan settings. The web page 810 displays the following setting items regarding scanning in accordance with the function of a printer selected on the web page 800. Examples of the setting items are the reading density, reading magnification, original size, presence/absence of a double-sided original, and file format of a document to be generated.

When the user selects an OK button 811 and the web browser unit 511 of the terminal 105 now displays the web page 810, the web page 810 changes to a web page 820 (scan setting storage page) shown in FIG. 6C. When the built-in web browser unit 521 of the multi-function peripheral 106 currently displays the web page 810, the web page 810 changes to a web page 840 shown in FIG. 6E.

The web page 820 shown in FIG. 6C displays a message indicating that scan settings are being stored. After the end of storing scan settings, the web page 820 changes to a web page 830 (scan setting storage page) shown in FIG. 6D.

The web page 830 shown in FIG. 6D displays a message indicating that scan settings have been stored. Since the display and operation are done on the web browser unit 511 of the terminal 105 at present, the setting contents are stored without executing scanning. At this time, a URL indicating the setting contents is registered as a "favorite" in the built-in web browser unit 521 of the multi-function peripheral 106. The web page 830 also displays the name ("ScanMode_2010/09/06_16:11:30") of the favorite.

The web page 840 (scan execution page) shown in FIG. 6E displays a message indicating that scanning is being executed. After the end of scanning, the web page 840 changes to a web page 850 (scan end page) shown in FIG. 6F. The web page 850 displays a message indicating that scanning has ended.

(Display Example of Operation Panel)

Designation of a URL (scan setting storage destination) registered in the favorites of the built-in web browser unit 521 of the multi-function peripheral 106 will be explained with reference to FIGS. 7A to 7C. The user authentication unit 524 or built-in web browser unit 521 can generate display data and display it on the operation panel 408. The user can perform an operation (input or instruction) via the operation panel 408 for the display contents.

Figure 7A:
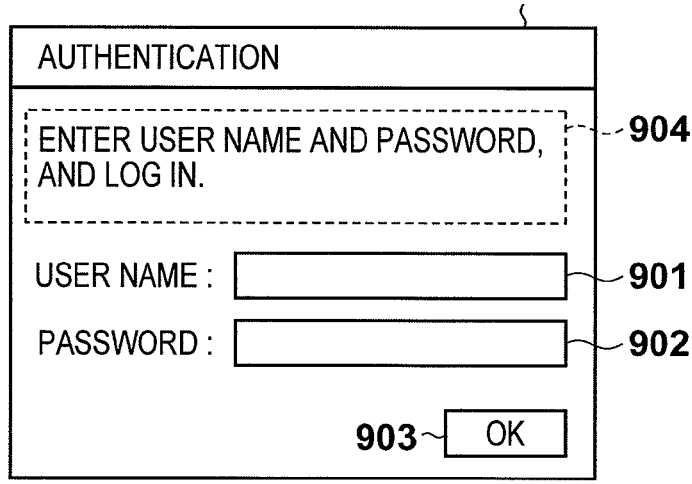
FIGS. 7A, 7B, and 7C are views showing display examples of screens.
Figure 7B:
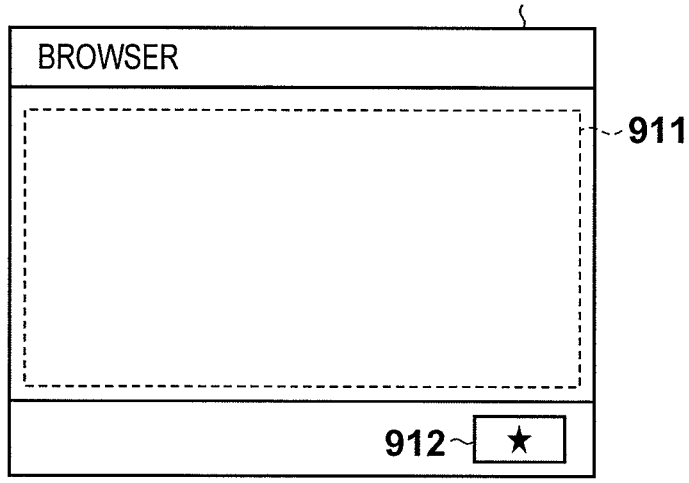
Figure 7C:
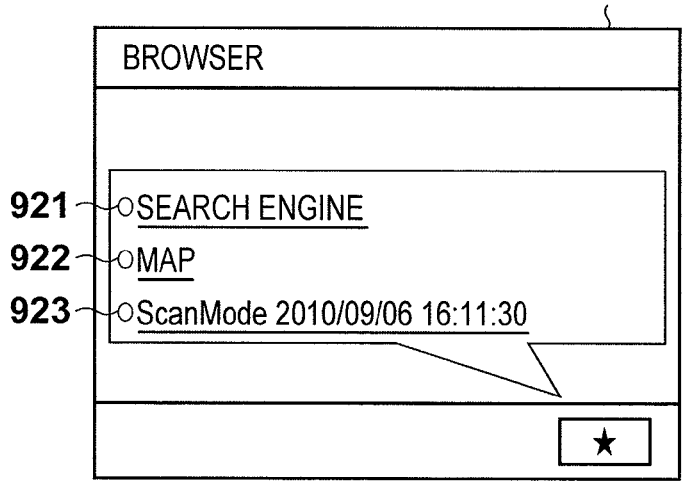

FIGS. 7A to 7C are views showing display examples on the operation panel 408 of the multi-function peripheral 106. A screen 900 (authentication screen) shown in FIG. 7A is used when the user performs an authentication operation. The user authentication unit 524 generates display data of the screen 900 and displays it on the operation panel 408.

A user name is input to a text input field 901. A password corresponding to the user name is input to a text input field 902. When the user selects an OK button 903, user authentication is executed based on the input information. If the authentication is successful, the screen 900 changes to a screen 910 shown in FIG. 7B. If the authentication has failed, the user authentication unit 524 displays an error message "user information is wrong." in a message display area 904, and the screen 900 does not change.

The built-in web browser unit 521 generates display data of the screen 910 shown in FIG. 7B and displays it on the operation panel 408. A web page display area 911 displays display data generated by analyzing a web page by the built-in web browser unit 521. Note that the web pages shown in FIGS. 6A to 6F are displayed in the web page display area 911. When the user selects a favorite button 912 the screen 910 changes to a screen 920 shown in FIG. 7C.

The screen 920 displays a list of favorites registered in the built-in web browser unit 521. The built-in web browser unit 521 displays display data of the screen 920 and displays it on the operation panel 408. In the display example of the screen 920 shown in FIG. 7C, three favorites of a currently authenticated user are registered. A favorite 921 ("search engine"), favorite 922 ("map"), and favorite 923 "ScanMode_2010/09/06_16:11:30" are registered favorites, respectively. When the user selects one of these favorites the built-in web browser unit 521 requests a web page of the registered URL.

The favorite 923 corresponds to scan settings stored based on the display and operation on the web browser unit 511 of the terminal 105. When the user selects the favorite 923 the screen 920 changes to the screen 910. Then, the built-in web browser unit 521 transfers a URL registered in correspondence with the favorite 923 to the document service 102 to request a web page. In response to the received request, the document service 102 generates the web page 810 which reflects the stored scan setting contents, and sends it back to the multi-function peripheral 106. As a result, the web page 810 reflecting the stored scan settings is displayed in the web page display area 911 within the screen 910.

(Scan Processing and Scan Setting Storage Processing)

Processing when the scanner device scans an original in accordance with an instruction from the document service 102 will be explained. The user displays a web page provided by the business service 101 on the web browser unit 511 of the terminal 105 or the built-in web browser unit 521 of the multi-function peripheral 106. In the following description, the web browser unit 511 of the terminal 105 and the built-in web browser unit 521 of the multi-function peripheral 106 will be generically called a "web browser unit" for convenience. Also, a device (terminal 105 or multi-function peripheral 106) on which the web browser unit runs will be called an "operation source terminal".

Figure 8:
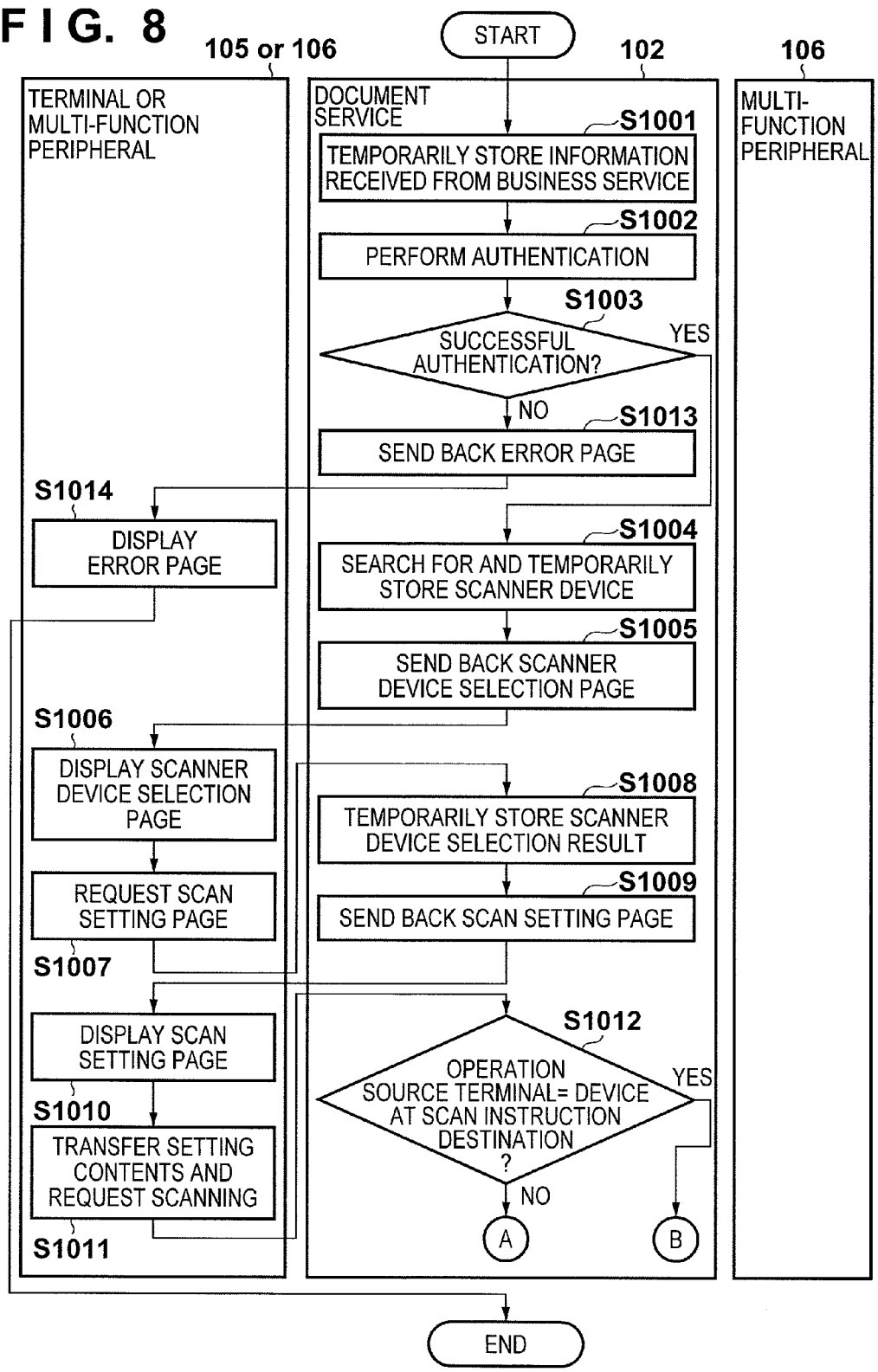
FIG. 8 is a flowchart showing a scan processing sequence.

Processing until the operation source terminal instructs the document service 102 to scan will be described. FIG. 8 is a flowchart showing the sequence of processing to be performed between the document service 102, the terminal 105, and the multi-function peripheral 106 when scanning is designated.

The sequence "starts" when the business service 101 requests scanning of the document service 102 (the web page (not shown) of the business service 101 changes to the web page 800 shown in FIG. 6A). At this time, the business service 101 transfers the following pieces of information to the document service 102:

user information: user information of a user currently authenticated by the business service 101 destination: destination indicating the transfer destination of a document generated by scanning return destination URL: URL indicating a destination to which a web page request is redirected from the document service 102 to the business service 101 after scanning The web container unit 502 of the document service 102 temporarily stores the received user information, destination, and return destination URL (step S1001). The web container unit 502 transfers the user information received from the business service 101 to the user authentication unit 501. The user authentication unit 501 performs authentication using the received user information, and sends back the result to the web container unit 502 (step S1002). A user corresponding to the user information has already been authenticated by the business service 101, but is authenticated again in consideration of security robustness. As described above, the business service 101 and the user authentication unit 501 of the document service 102 assign authentication processing to the same external authentication service. The web container unit 502 determines whether the authentication is successful in step S1002 (step S1003). If the authentication is successful, the process shifts to step S1004; if NO, to step S1013.

The web container unit 502 searches for a scanner device which can be instructed to scan, and temporarily stores it (step S1004). This processing is executed as follows. First, the web container unit 502 transfers the following pieces of information to the scanner device management unit 503:

user information (user name) during authentication which is temporarily stored the global address of a local network to which the operation source terminal belongs, which is acquired from a TCP/IP packet The scanner device management unit 503 searches the scanner device information table 600 for all records in which the global address data item 605 and global address match each other and the user name data item 606 and user name match each other. The scanner device management unit 503 transfers, as the search result to the web container unit 502, a list of scanner devices which can be instructed to scan. The web container unit 502 temporarily stores the acquired list of scanner devices which can be instructed to scan. The web container unit 502 generates the web page 800 from the list of scanner devices which can be instructed to scan, and sends it back as a response to the operation source terminal (step S1005).

The web browser unit of the operation source terminal receives the web page 800 from the document service 102 and displays it (step S1006). If the user selects the Next button 804 within the web page 800, the web browser unit transfers the scanner device selection result by the user to the document service 102, and requests the web page 810 (step S1007).

Upon receiving the request from the operation source terminal, the web container unit 502 of the document service 102 temporarily stores the received scanner device selection result (step S1008). The web container unit 502 generates the web page 810 and sends it back as a response to the operation source terminal (step S1009). At this time, the web container unit 502 acquires a scanner device model code (value in the model code data item 604) from the scanner device selection result received in step S1008 and the list of scanner devices which can be instructed to scan, which has been stored in step S1004. The web container unit 502 determines a scan setting item in accordance with the acquired value, and generates the web page 810.

The web browser unit of the operation source terminal displays the web page 810 sent back from the document service 102 in step S1009 (step S1010). If the user selects the OK button 811, the web browser unit of the operation source terminal transfers the scan setting result by the user to the document service 102, and requests scanning (step S1011). At this time, the IP address of the operation source terminal is transferred. When the operation source terminal is the multi-function peripheral 106, the built-in web browser unit 521 (first instruction unit) transfers the request. When the operation source terminal is the terminal 105, the web browser unit 511 (second instruction unit) transfers the request.

Upon receiving the scan request, the web container unit 502 of the document service 102 determines whether the operation source terminal and a device at the scan instruction destination are the same device (step S1012). Hence, the web container unit 502 implements a reception unit. In the embodiment, this determination is executed as follows. The web container unit 502 acquires the IP address (value in the IP address data item 602) of the selected scanner device based on the list of scanner devices which can be instructed to scan, which has been stored in step S1004, and the scanner device selection result stored in step S1008. Then, the web container unit 502 compares the acquired IP address with the IP address of the operation source terminal that has been transferred in step S1011. If these IP addresses match each other, the web container unit 502 determines that the operation source terminal and the device at the scan instruction destination are the same device. If the operation source terminal and the device coincide with each other (YES in step S1012), the process shifts to a processing sequence shown in FIG. 10; if NO in step S1012, to a processing sequence shown in FIG. 9.

If the authentication has failed in step S1003 (NO in step S1003), the web container unit 502 generates a web page (not shown) representing an error, and sends it back as a response (step S1013). The web browser unit of the operation source terminal receives the web page representing an error, and displays it (step S1014). The process then ends.

Figure 9:
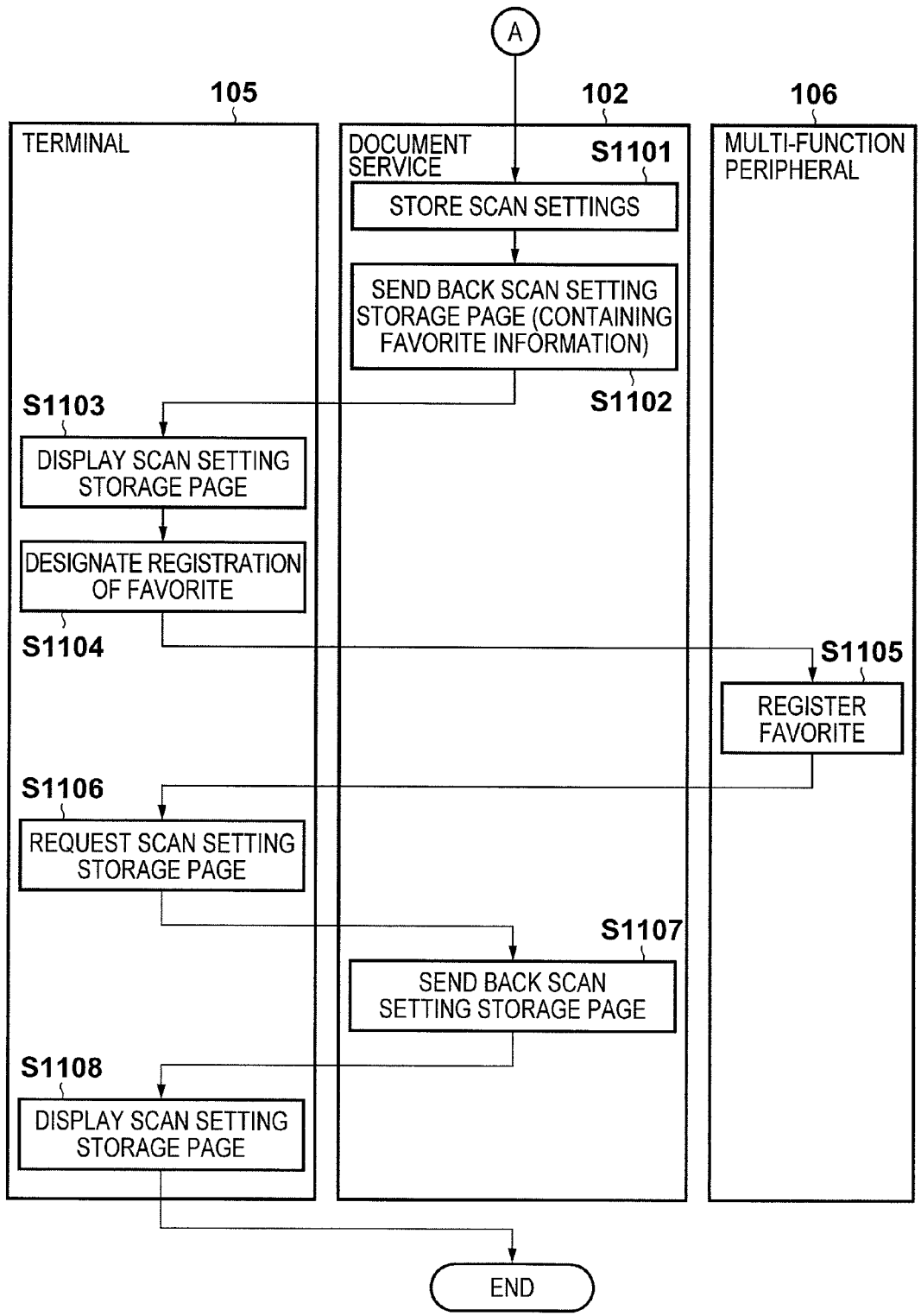
FIG. 9 is a flowchart showing a scan processing sequence based on an instruction from a terminal.

Processing when it is determined in step S1012 that the operation source terminal and a device to execute scanning do not coincide with each other (NO in step S1012), that is, the operation source terminal is the terminal 105 will be described with reference to FIG. 9.

The web container unit 502 of the document service 102 stores the scan setting result transferred from the terminal 105 in step S1011 (step S1101). At this time, the web container unit 502 generates a URL indicating a storage destination. In the embodiment, this URL serves as identification information of the scan settings. As the identification information, an ID or the like may be issued and managed in correspondence with scan settings, instead of the URL. The web container unit 502 stores the generated URL in the favorites of the built-in web browser unit 521 of the multi-function peripheral 106. At this time, the web container unit 502 generates even the name of the favorite. In the embodiment, the favorite name is generated so that the favorite can be identified and sorted by the date and time, like "ScanMode_2010/09/06_16:11:30". However, the name is not limited to this, and a user-convenient name can be assigned.

The web container unit 502 generates the web page 820 and sends it back as a response to the terminal 105 (step S1102). The web page 820 contains a script such as JavaScript®. This script defines processing of transferring the message 701 to the multi-function peripheral 106 and adding a favorite. The URL which has been generated in step S1101 and indicates a scan setting storage destination is set in the Url tag of the message 701. The favorite name generated in step S1101 is set in the Name tag of the message 701.

The web browser unit 511 of the terminal 105 displays the web page 820 sent back from the document service 102 in step S1102 (step S1103). After displaying the web page 820 in step S1103, the web browser unit 511 executes the script contained in the web page, and transfers the message 701 to the multi-function peripheral 106. Accordingly, the multi-function peripheral 106 is instructed to register the favorite (step S1104).

Upon receiving the message 701, the web service unit 523 of the multi-function peripheral 106 analyzes it. The web service unit 523 transfers the URL in the Url tag and the favorite name in the Name tag to the built-in web browser unit 521, and causes the built-in web browser unit 521 to register them as a favorite (step S1105). Upon completion of registering the favorite, the web browser unit 511 of the terminal 105 requests the web page 830 of the document service 102 (step S1106).

In response to the request from the terminal 105, the web container unit 502 of the document service 102 generates the web page 830 and sends it back as a response to the terminal 105 (step S1107). The web browser unit 511 of the terminal 105 displays the web page 830 sent back from the document service 102 in step S1107 (step S1108). The process then ends.

Figure 10:
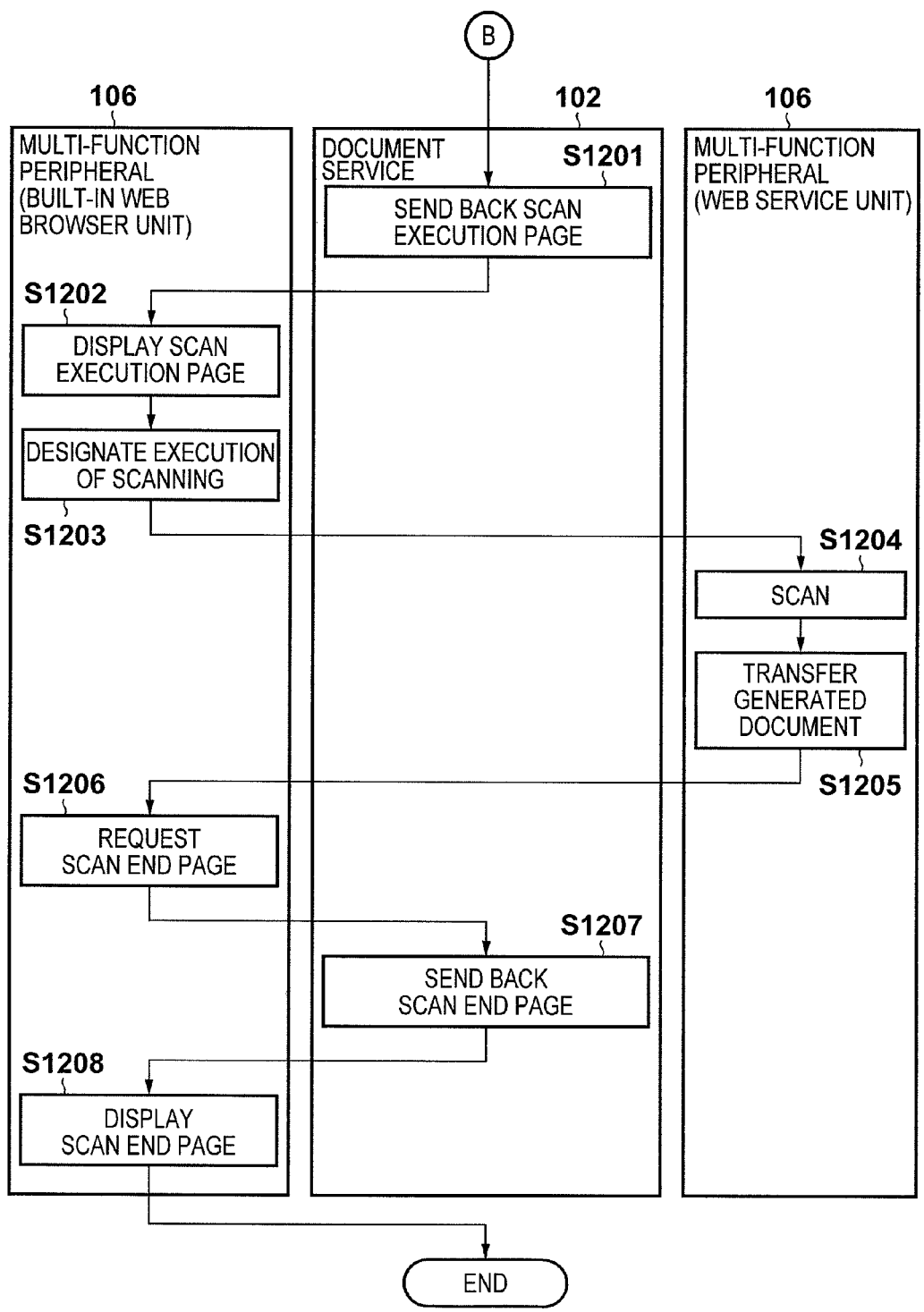
FIG. 10 is a flowchart showing a scan processing sequence based on an instruction from a multi-function peripheral.

Next, processing when it is determined in step S1012 that the operation source terminal and a device instructed to scan coincide with each other (YES in step S1012), that is, the operation source terminal is the multi-function peripheral 106 will be described with reference to FIG. 10.

The web container unit 502 of the document service 102 generates the web page 840 shown in FIG. 6E and sends it back as a response to the multi-function peripheral 106 (step S1201). The web page 840 contains a script. This script defines processing of transferring the message 703 to the multi-function peripheral 106 and causing the multi-function peripheral 106 to execute scanning. The scan setting contents transferred in step S1011 are set in respective tags below the ScanMode tag of the message 703. The destination temporarily stored in step S1001 is set in the Address tag of the message 703.

The built-in web browser unit 521 of the multi-function peripheral 106 displays the web page 840 sent back from the document service 102 in step S1201 (step S1202). After displaying the web page 840 in step S1202, the built-in web browser unit 521 executes the script contained in the web page, and transfers the message 703 to the web service unit 523. By this processing, the multi-function peripheral 106 is instructed to execute scanning (step S1203).

Upon receiving the message 703, the web service unit 523 analyzes it. The web service unit 523 transfers, to the scanning unit 522, scan settings in respective tags below the ScanMode tag, and executes scanning (step S1204). When scanning by the scanning unit 522 ends and a document is generated, the web service unit 523 transfers the document to the destination in the Address tag of the message 703 (step S1205).

After the end of processing in step S1205, the built-in web browser unit 521 requests the web page 850 of the document service 102 (step S1206). This request is issued by executing a script contained in the web page 840.

In response to the request from the multi-function peripheral 106, the web container unit 502 of the document service 102 generates the web page 850 and sends it back as a response to the multi-function peripheral 106 (step S1207).

The built-in web browser unit 521 of the multi-function peripheral 106 displays the web page 850 sent back from the document service 102 in step S1207 (step S1208). After that, the process ends.

In the embodiment, a URL indicating a destination to which a web page request is redirected from the document service 102 to the business service 101 is temporarily stored as a return destination URL in step S1001. In the above description, the document service 102 redirects a web page request to the URL in accordance with the following instructions:
  instruction to an OK button 831 within the web page 830
  instruction to an OK button 851 within the web page 850
  According to these instructions, the web browser unit 511 of the terminal 105 or the built-in web browser unit 521 of the multi-function peripheral 106 displays a web page provided by the business service.

(Scan Processing by Favorite Selection)

Figure 11:
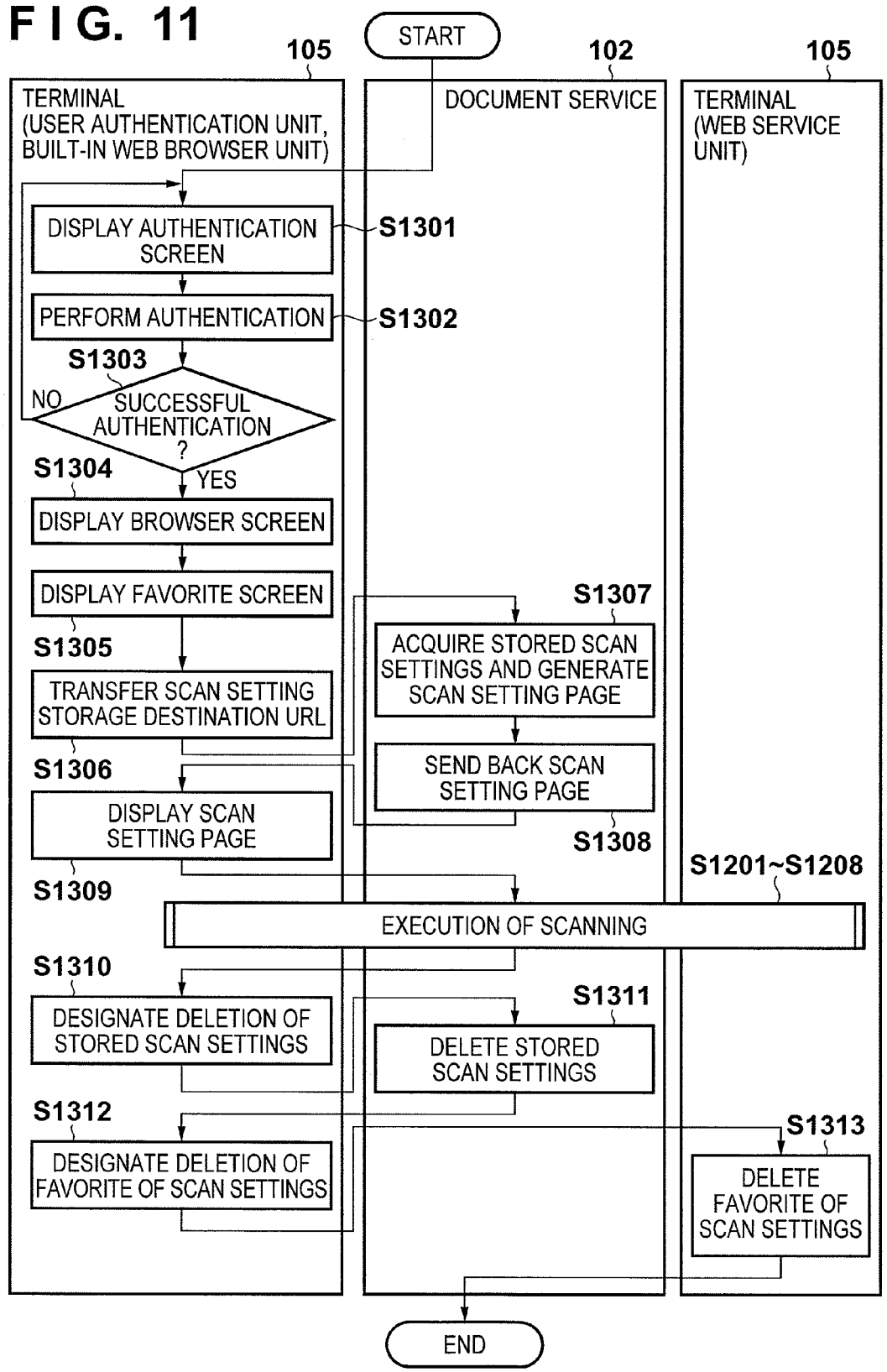
FIG. 11 is a flowchart showing a processing sequence after scan setting registration.

Processing of selecting a favorite registered in step S1105 in the built-in web browser unit 521 of the multi-function peripheral 106, and executing scanning with the stored setting contents will be explained with reference to FIG. 11.

The user authentication unit 524 of the multi-function peripheral 106 displays the screen 900 shown in FIG. 7A (step S1301). If the user selects the OK button 903, the user authentication unit 524 performs authentication using a user name input to the text input field 901 and a password input to the text input field 902 (step S1302). In the embodiment, authentication processing is requested of an external service (authentication service: not shown), as described above.

The user authentication unit 501 determines whether the authentication is successful in step S1302 (step S1303). If the authentication is successful (YES in step S1303), the process shifts to step S1304; if the authentication has failed (NO in step S1303), returns to step S1301.

In step S1304, the user authentication unit 501 notifies the built-in web browser unit 521 of the successful authentication, and the built-in web browser unit 521 displays the screen 910 shown in FIG. 7B. When the user selects the favorite button 912 within the screen 910, the built-in web browser unit 521 displays the screen 920 shown in FIG. 7C (step S1305). The favorite 923 is a favorite which has been registered in step S1105 and contains a URL indicating a scan setting storage destination. If the user designates the favorite 923, the built-in web browser unit 521 transfers the URL to the document service 102 to request a web page (step S1306). This implements an identification information transmission unit. At this time, the built-in web browser unit 521 temporarily stores the URL and favorite name of the favorite 923.

Upon receiving the URL request from the multi-function peripheral 106, the web container unit 502 of the document service 102 acquires scan settings indicated by the URL. The web container unit 502 generates the web page 810 which reflects the acquired scan settings (step S1307), and sends it back as a response to the multi-function peripheral 106 (step S1308). This implements a settings transmission unit.

The built-in web browser unit 521 of the multi-function peripheral 106 displays the web page 810 sent back from the document service 102 in step S1308 (step S1309).

As a result, the multi-function peripheral 106 can display scan settings made on the terminal 105 by a simple operation of designating the favorite 923. When the user designates the OK button 811, the multi-function peripheral 106 can execute scanning (steps S1201 to S1208).

In the embodiment, the web page 850 generated in step S1207 contains a script which defines the following processes:
  transfer the message 711 to the document service 102 and delete stored scan settings
  set, in the Url tag of the message 711, a URL temporarily stored in step S1306
  transfer the message 703 to the web service unit 523 and delete the favorite 923
  set, in the Url tag of the message 703, a URL temporarily stored in step S1306 and, in the Name tag, a favorite name temporarily stored in step S1306

After displaying the web page 850 in step S1208, the built-in web browser unit 521 executes the script contained in the web page, and transfers the message 711 to the document service 102. The built-in web browser unit 521 designates deletion of stored scan settings (step S1310).

Upon receiving the message 711 from the multi-function peripheral 106, the web container unit 502 of the document service 102 analyzes it. The web container unit 502 deletes the scan settings indicated by the URL designated in the Url tag (step S1311).

After the end of processing in step S1311, the built-in web browser unit 521 of the multi-function peripheral 106 transfers the message 702 to the web service unit 523 (step S1312). By the message 702, the built-in web browser unit 521 designates deletion of the favorite 923.

Upon receiving the message 702 from the built-in web browser unit 521, the web service unit 523 analyzes it. The web service unit 523 instructs the built-in web browser unit 521 to delete a favorite which matches the URL designated in the Url tag and the favorite name designated in the Name tag (step S1313). Thereafter, the process ends.

In the above processing sequences according to the embodiment, scanning is executed when the OK button 811 is selected. However, it can also be configured to execute the script of the web page 810 generated in step S1308 immediately when the web page 810 is displayed. In this case, scanning is done by a smaller number of operation steps.

Further, the processing sequences may be configured as follows. In step S1304, the built-in web browser unit 521 determines, based on the favorite name, whether a favorite corresponding to a URL indicating scan settings has been registered. If so, the processing in step S1306 is executed quickly. Since scanning is executed by a smaller number of operation steps, the configuration can be further simplified. If it is determined that a plurality of URLs each indicating scan settings are registered, the processing in step S1305 is performed.

When scan settings are registered but no corresponding processing is executed even after the lapse of a predetermined time, the scan settings may be deleted. In this case, a corresponding message is transferred to the device.

In the above description of the embodiment, the business service requests scanning of the document service, thereby instructing a scanner device on a local network to scan. Even when the document service provides a customized UI for a scanner device, the embodiment can be applied with the same configuration and procedures except for exchange with the business service. More specifically, when the user makes scan settings from the web browser of a PC, the scan settings are stored in the document service. Then, a URL indicating the scan settings is registered in the favorites of the built-in web browser of the scanner device. By only operating the built-in web browser and designating a favorite, the user can execute scanning with the contents set from the web browser of the PC.

When a customized UI provided by the document service is displayed on the built-in web browser of the scanner device and scanning is designated, scanning is executed quickly. In this case, the operability of the scanner device is not impaired.

According to the embodiment, when a scanner device on a local network is instructed to scan from a service on the Internet, scanning can be done by a simpler operation while preventing scanning of an original the user does not want.

Second Embodiment

The first embodiment has explained a method in which a scan setting/start instruction from the web browser of a PC is always stored and an operation is performed from the built-in web browser of the scanner device. However, for an operation from the browser of a PC in a small-scale office or a PC positioned near a scanner device, the risk of scanning an original the user does not want is low. In such a case, it may be as well to execute scanning quickly even by an operation from the web browser of a PC. The second embodiment will describe a method of quickly executing scanning for an operation from the web browser of a specific PC.

(Terminal Information Managed by Document Service)

Figure 12:
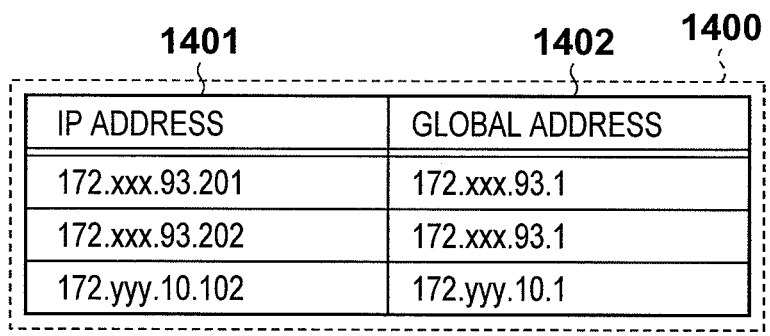
FIG. 12 is a table exemplifying the structure of a scan quick execution terminal table according to the second embodiment.

FIG. 12 is a table showing the format of data managed by a web container unit 502 of a document service 102. Scanning is executed immediately when a scan setting/execution instruction is received from a terminal having an address registered as the data.

A scan quick execution terminal table 1400 is a data table which stores each terminal. One record (row) in the scan quick execution terminal table 1400 indicates one terminal. An IP address data item 1401 is a data item indicating the IP address of a terminal on a local network. A global address data item 1402 is a data item indicating a global address assigned to a local network to which a terminal belongs.

Figure 13:
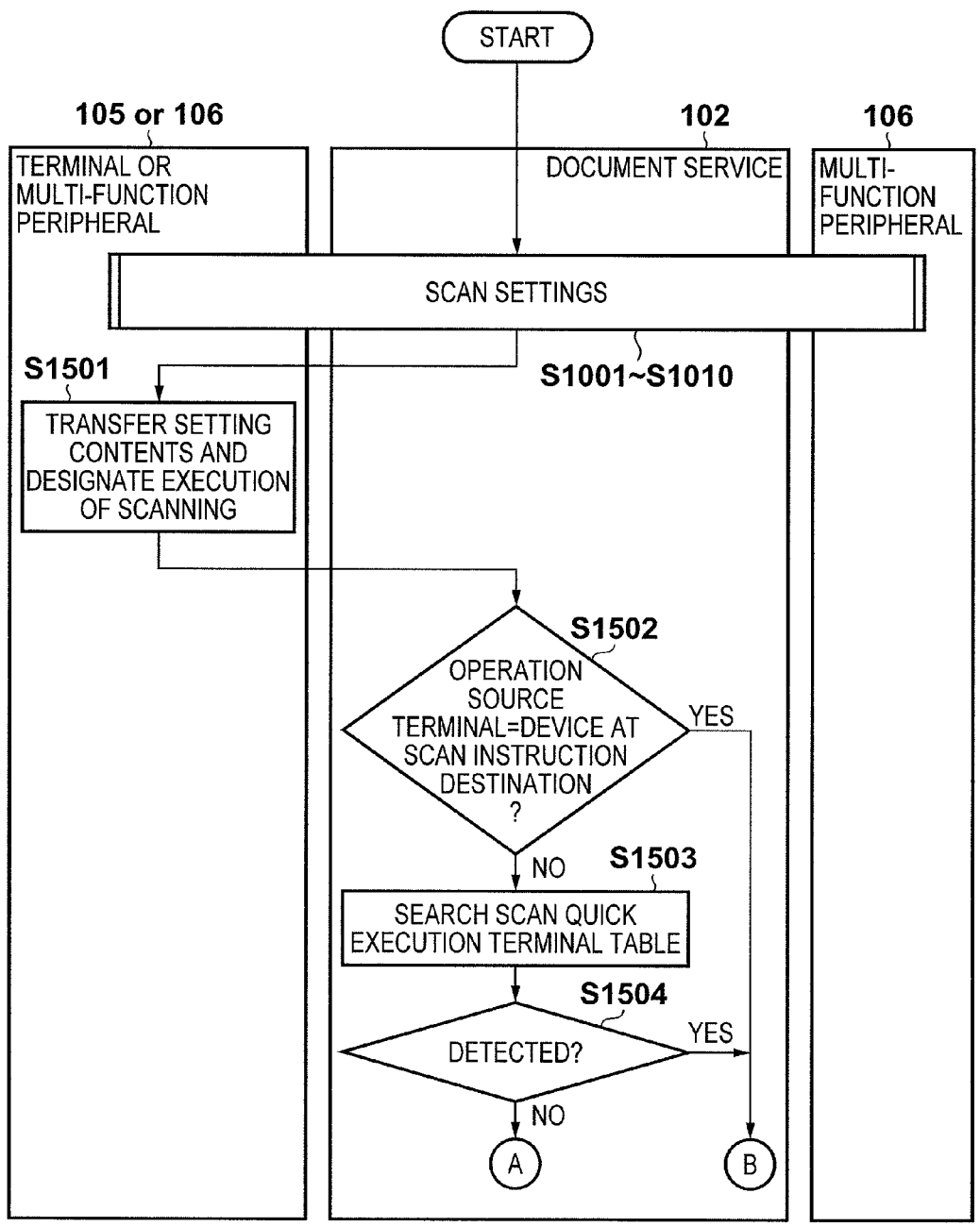
FIG. 13 is a flowchart showing a scan processing sequence according to the second embodiment.

FIG. 13 is a flowchart showing the sequence of processing to be performed between the document service 102, a terminal 105, and a multi-function peripheral 106 when scanning is designated in the second embodiment.

Processes in steps S1001 to S1010 are the same as those in FIG. 8. If the user selects an OK button 811 within a web page 810 shown in FIG. 6B, the web browser unit of an operation source terminal transfers the scan setting result to the document service 102, and requests scanning (step S1501). At this time, the IP address of the operation source terminal is transferred.

Upon receiving the scan request from the operation source terminal, the web container unit 502 of the document service 102 determines whether the operation source terminal and a device at the scan instruction destination are the same device (step S1502). This determination is executed by the same method as that in step S1012. If the operation source terminal and device coincide with each other (YES in step S1502), the process shifts to a processing sequence shown in FIG. 10; if NO in step S1502, to step S1503.

In step S1503, the web container unit 502 acquires, from a TCP/IP packet in communication with the operation source terminal (in this case, the terminal 105), the global address of a local network to which the operation source terminal belongs. The web container unit 502 searches the scan quick execution terminal table 1400 for a record corresponding to the acquired global address and the IP address of the operation source terminal which has transferred the setting contents in step S1501.

The web container unit 502 determines whether the corresponding record has been detected in step S1503 (step S1504). If the corresponding record has been detected (YES in step S1504), the process shifts to the processing sequence shown in FIG. 10. That is, scanning is executed quickly even for a scan instruction from the web browser of the terminal 105. If no corresponding record has been detected (NO in step S1504), the process shifts to the processing sequence shown in FIG. 9.

In this manner, according to the second embodiment, scanning can be executed quickly for an instruction from the web browser of a PC near a scanner device.

Third Embodiment

The first and second embodiments have explained scan processing. The third embodiment will describe print processing. Note that the printing system configuration and physical configuration according to the third embodiment are the same as those in the first embodiment, and a description thereof will be omitted.

(Logical Configuration)

Figure 14:
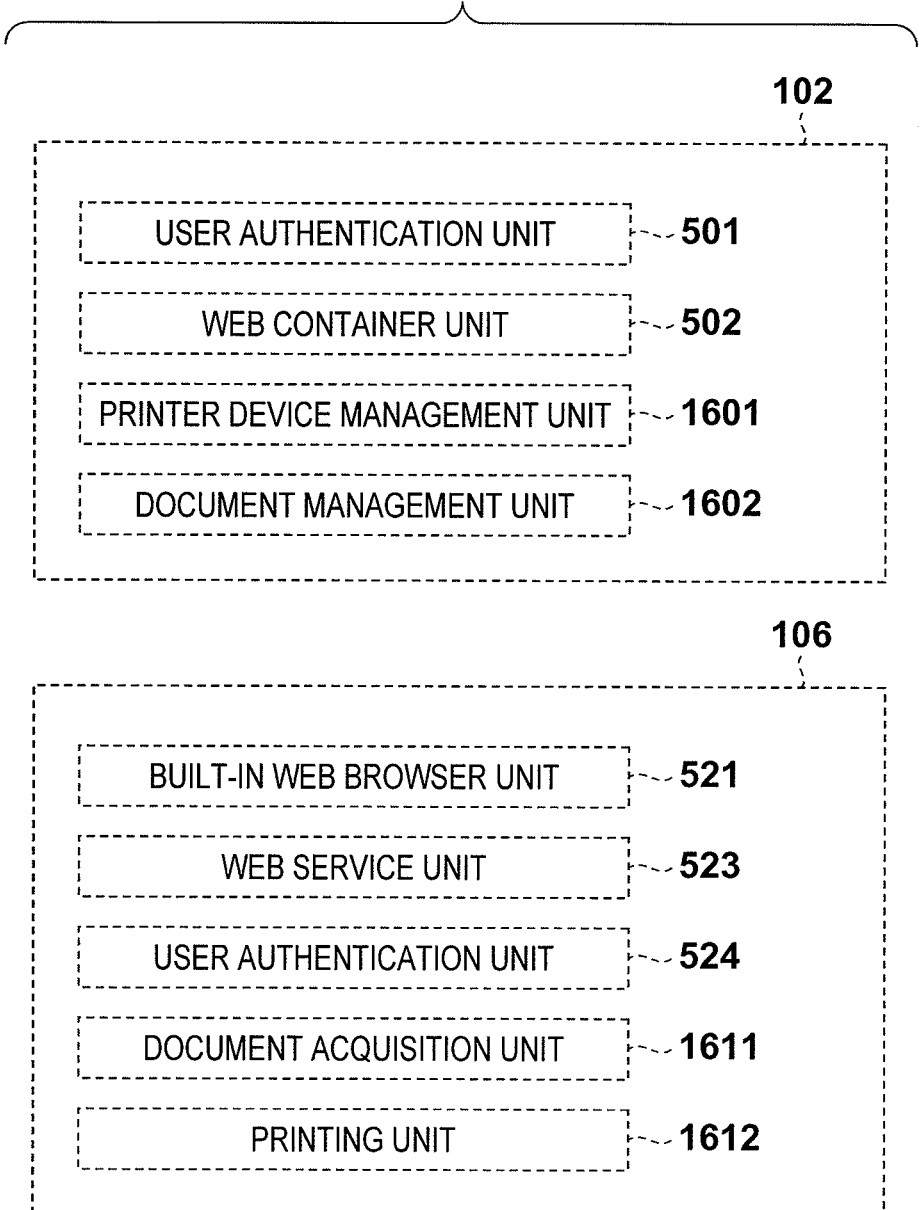
FIG. 14 is a block diagram showing the schematic logical configurations of respective apparatuses according to the third embodiment.

The logical configuration of a terminal 105 is the same as that in the first embodiment, and a description thereof will be omitted. FIG. 14 is a block diagram showing the schematic logical configurations of a document service 102 and multi-function peripheral 106.

The logical building components of the document service 102 will be described first. A user authentication unit 501 and web container unit 502 are the same as those in the first embodiment. A printer device management unit 1601 stores and manages printer device information. A document management unit 1602 manages a document to be printed by a printer device, and sends back, to the printer device, PDL data generated from the document in response to a request from the printer device. In the embodiment, the document is one created by the user using a business service 101. The business service 101 transfers the document to the document service

102. The document management unit 1602 receives the document via a communication I/F 204, and stores it in a hard disk 207. At this time, the document management unit 1602 stores the document in association with a user managed by the user authentication unit 501.

Next, the logical building components of the multi-function peripheral 106 will be described. A built-in web browser unit 521, web service unit 523, and user authentication unit 524 are the same as those in the first embodiment. A document acquisition unit 1611 downloads a document (PDL data) to be printed from the document service 102 via a communication I/F 404. A printing unit 1612 converts the document acquired by the document acquisition unit 1611 into an image signal, and outputs the image signal to a printer engine 405 to print.

(Printer Device Information Managed by Document Service)

The printer device management unit 1601 of the document service 102 manages printer device information in the same format as that of the scanner device information table 600 shown in FIG. 4. Although not shown in FIG. 14, the printer device management unit 1601 has a printer device information table in the same format as that in FIG. 4.

(Terminal Information Managed by Document Service)

The web container unit 502 of the document service 102 manages information of a terminal which executes quick printing after an execution instruction in the same format as that in a scan quick execution terminal table 1400 shown in FIG. 12. Although not shown in FIG. 14, the web container unit 502 has a print quick execution terminal table in the same format as that in FIG. 12.

(Document Service and Web Service of Multi-Function Peripheral)

FIG. 15 is a schematic view showing the formats of data received by the web container unit 502 of the document service 102 and the web service unit 523 of the multi-function peripheral 106. The web container unit 502 of the document service 102 or the web service unit 523 of the multi-function peripheral 106 receives a processing execution instruction from an external device. The received execution instruction is a message in the SOAP format using HTTP as a wire protocol, similar to one shown in FIG. 5.

A message 1701 contains settings used in a web service which causes the multi-function peripheral 106 to execute printing. The web service executes printing at designated settings. The message 1701 is formed from a Print tag and contains the following pieces of information as parameters:

various print settings (Count, PaperSize, Staple, and Two-Side tags below a PrintMode tag)

URL (Url tag) indicating the storage destination of a document to be printed

A message 1711 contains settings used in a web service which causes the document service 102 to delete stored print settings. The message 1711 is formed from a DeletePrint-Mode tag and contains, as a parameter, a URL (Url tag) indicating print settings to be deleted.

(Example of Screen)

Web pages displayed by a web browser unit 511 and the built-in web browser unit 521, and screens displayed by the user authentication unit 524 and built-in web browser unit 521 will be explained with reference to screen views.

(Display Example of Web Page)

FIGS. 16A to 16F are views showing display examples of web pages representing setting and execution of printing. When the user designates printing on a web page (not shown) provided by the business service 101, the web page changes to a web page 1800 (printer device selection page) shown in FIG. 16A. At this time, the business service 101 redirects a web page request to the document service 102. The business service 101 transfers the following pieces of information to the document service 102:

user information: user information of a user currently authenticated by the business service 101 document: document to be printed return destination URL: URL indicating a destination to which a web page request is redirected from the document service 102 to the business service 101 after printing The web page 1800 allows the user to select a printer device to execute printing from printer devices registered in the printer device information table. The web page 1800 displays a list of printer devices belonging to the same local network as that of a device which displays the web page 1800, out of printer devices stored in the document service 102 in association with a currently authenticated user. In the display example shown in FIG. 16A, three printer devices are displayed as choices.

Radio buttons 1801, 1802, and 1803 display a printer device selection state based on the user input result. When the user selects a Next button 1804, the web page 1800 changes to a web page 1810 (print setting page) shown in FIG. 16B.

The web page 1810 shown in FIG. 16B is used to make print settings. The web page 1810 displays the following setting items regarding printing in accordance with the function of a printer selected on the web page 1800.

print count paper size staple type presence/absence of a double-sided output

When the user selects an OK button 1811 within the web page 1810 and the web browser unit 511 of the terminal 105 now displays the web page 1810, the web page 1810 changes to a web page 1820 (print setting storage page) shown in FIG. 16C. When the built-in web browser unit 521 of the multi-function peripheral 106 currently displays the web page 1810, the web page 1810 changes to a web page 1830 (print storage setting page) shown in FIG. 16D.

The web page 1820 shown in FIG. 16C displays a message indicating that print settings are being stored. After the end of storing print settings, the web page 1820 changes to the web page 1830 shown in FIG. 16D. The web page 1830 shown in FIG. 16D displays a message indicating that print settings have been stored. Since the display and operation are done on the web browser unit 511 of the terminal 105 at present, the setting contents are stored without executing printing. At this time, a URL indicating the setting contents is registered as a "favorite" in the built-in web browser unit 521 of the multi-function peripheral 106. The web page 1830 also displays the name ("PrintMode_2010/09/13_12:42:30") of the favorite.

A web page 1840 (print execution page) displays a message indicating that printing is being executed. After the end of printing, the web page 1840 changes to a web page 1850 (print end page) shown in FIG. 16F. The web page 1850 displays a message indicating that printing has ended.

(Display Example of Operation Panel)

Figure 17A:
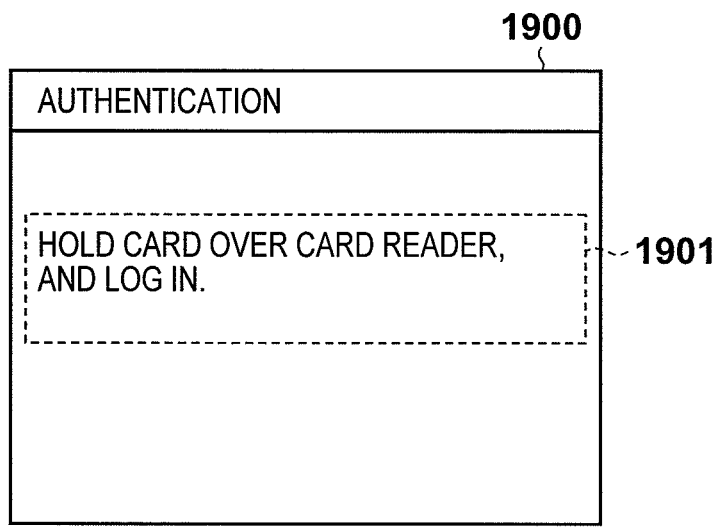
FIGS. 17A and 17B are views showing display examples of screens.
Figure 17B:
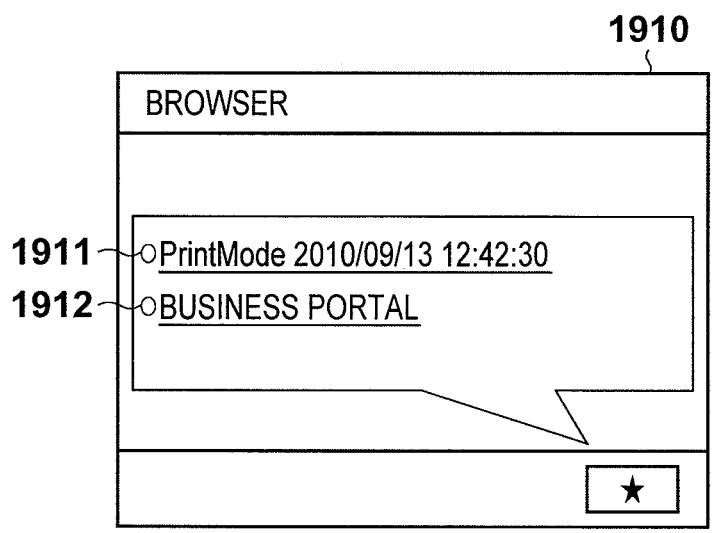

Designation of a URL (print setting storage destination) registered in the favorites of the built-in web browser unit 521 of the multi-function peripheral 106 will be explained with reference to screen views shown in FIGS. 17A and 17B. FIGS. 17A and 17B are views showing display examples on an operation panel 408 of the multi-function peripheral 106.

A screen 1900 (authentication screen) shown in FIG. 17A is used when the user performs an authentication operation. The user authentication unit 524 generates display data of the screen 1900 and displays it on the operation panel 408. The user holds, over a card reader (not shown) arranged near the multi-function peripheral 106, an IC card which records user information. Then, the card reader transfers the user information to the multi-function peripheral 106. The user authentication unit 524 receives the user information via the communication I/F 404 and performs authentication. If the authentication is successful, the screen 1900 changes to a favorite screen 1910 shown in FIG. 17B. If the authentication has failed, an error message "user information is illicit." is displayed in a message display area 1901 within the screen 1900, and the screen does not change.

The screen 1910 shown in FIG. 17B displays a list of favorites registered in the built-in web browser unit 521. The screen 1910 is identical to the screen 920 shown in FIG. 7C and displays favorites for printing. In the display example of the screen 1910 shown in FIG. 17B, two favorites of a currently authenticated user are registered.

If authentication by the user authentication unit 524 is successful, the screen generally changes to a screen 910 shown in FIG. 7B. However, when a favorite containing a URL indicating print settings has been registered, the screen changes to the screen 1910. For example, if the favorite name starts from "PrintMode", it is determined that a favorite containing a URL indicating print settings has been registered. This can omit one user operation step.

A favorite 1911 ("PrintMode_2010/09/13_12:42:30") and favorite 1912 ("business portal") displayed on the screen 1910 are registered favorites, respectively. When the user selects one of these favorites, the registered URL is requested of a web page. The favorite 1911 corresponds to print setting contents stored based on the display and operation on the web browser unit 511 of the terminal 105. When the user selects the favorite 1911, the screen 1910 changes to the screen 910. Then, the registered URL is transferred to the document service 102 to request a web page. The document service 102 generates the web page 1810 which reflects the stored print setting contents, and sends it back to the multi-function peripheral 106. As a result, the web page 1810 reflecting the stored print setting contents is displayed in a web page display area 911 within the screen 910.

(Print Processing and Print Setting Storage Processing)

Processing when the printer device prints a document in accordance with an instruction from the document service 102 will be explained. The user displays a web page provided by the business service 101 on the web browser unit 511 of the terminal 105 or the built-in web browser unit 521 of the multi-function peripheral 106.

Processing until the operation source terminal instructs the document service 102 to print will be described. FIG. 18 is a flowchart showing the sequence of processing to be performed between the document service 102, the terminal 105, and the multi-function peripheral 106 when printing is designated.

The sequence "starts" when the business service 101 requests printing of the document service 102 (the web page (not shown) of the business service changes to the web page 1800 shown in FIG. 16A). At this time, the business service 101 transfers the following pieces of information to the document service 102:

user information: user information of a user currently authenticated by the business service 101
document: document to be printed
return destination URL: URL indicating a destination to which a web page request is redirected from the document service 102 to the business service 101 after printing The document service 102 transfers the received document to the document management unit 1602. The document management unit 1602 converts the document into PDL data. The document management unit 1602 stores and manages the document (PDL data), and sends back position information (URL) of the storage destination to the web container unit 502. The web container unit 502 temporarily stores the user information, return destination URL, and URL indicating the document storage destination which have been received from the business service 101 (step S2001). The web container unit 502 transfers the user information received from the business service 101 to the user authentication unit 501. The user authentication unit 501 performs authentication using the received user information, and sends back the result to the web container unit 502 (step S2002).

The web container unit 502 determines whether the authentication is successful in step S2002 (step S2003). If the authentication is successful (YES in step S2003), the process shifts to step S2004; if the authentication has failed (NO in step S2003), to step S2015. The web container unit 502 searches for a printer device which can be instructed to print, and temporarily stores it (step S2004). The processing in step S2004 is executed as follows. The web container unit 502 transfers the following pieces of information to the printer device management unit 1601:

user information (user name) during authentication which is temporarily stored
the global address of a local network to which the operation source terminal belongs, which is acquired from a TCP/IP packet The printer device management unit 1601 searches the printer device information table for all records in which a global address data item 605 and global address match each other and a user name data item 606 and user name match each other. The printer device management unit 1601 transfers, as the search result to the web container unit 502, a list of printer devices which can be instructed to print. The web container unit 502 temporarily stores the acquired list of printer devices which can be instructed to print. The web container unit 502 generates the web page 1800 from the list of printer devices which can be instructed to print, and sends it back as a response to the operation source terminal (step S2005).

The web browser unit of the operation source terminal receives and displays the web page 1800 (step S2006). If the user selects the Next button 1804 within the web page 1800, the web browser unit transfers the printer device selection result by the user to the document service 102, and requests the web page 1810 (step S2007).

Upon receiving the request from the operation source terminal, the web container unit 502 of the document service 102 temporarily stores the received printer device selection result (step S2008). The web container unit 502 generates the web page 1810 and sends it back as a response to the operation source terminal (step S2009). At this time, the web container unit 502 acquires a printer device model code (value in an model code data item 604) from the printer device selection result received in step S2008 and the list of printer devices which can be instructed to print, which has been stored in step S2004. The web container unit 502 determines a print setting item in accordance with this value, and generates the web page 1810.

The web browser unit of the operation source terminal displays the web page 1810 sent back from the document service 102 in step S2009 (step S2010). If the user selects the OK button 1811 within the web page 1810, the web browser unit transfers the print setting result by the user to the document service 102, and requests printing (step S2011). At this time, the IP address of the operation source terminal is transferred.

Upon receiving the print request from the operation source terminal, the web container unit 502 of the document service 102 determines whether the operation source terminal and a device at the print instruction destination are the same device (step S2012). In the embodiment, this determination is executed as follows. The web container unit 502 acquires the IP address (value in an IP address data item 602) of the selected printer device based on the list of printer devices which can be instructed to print, which has been stored in step S2004, and the printer device selection result stored in step S2008. Then, the web container unit 502 compares the acquired IP address with the IP address of the operation source terminal that has been transferred in step S2011. If these IP addresses match each other, the web container unit 502 determines that the operation source terminal and a printer at the print instruction destination are the same device. If these IP addresses match each other (YES in step S2012), the process shifts to a processing sequence shown in FIG. 20; if NO in step S2012, to step S2013.

The web container unit 502 acquires, from a TCP/IP packet in communication with the operation source terminal (in this case, the terminal 105), the global address of a local network to which the operation source terminal belongs. The web container unit 502 searches the print quick execution terminal table for a record corresponding to the acquired global address and the IP address of the operation source terminal which has been transferred in step S2011 (step S2013). The web container unit 502 determines whether the corresponding record has been detected in step S2013 (step S2014). If the corresponding record has been detected (YES in step S2014), the process shifts to the processing sequence shown in FIG. 20. That is, printing is executed quickly even for a print instruction from the web browser of the terminal 105. If no corresponding record has been detected (NO in step S2014), the process shifts to the processing sequence shown in FIG. 19.

If the authentication has failed in step S2003 (NO in step S2003), the web container unit 502 generates a web page (not shown) representing an error, and sends it back as a response to the operation source terminal (step S2015). The web browser unit of the operation source terminal receives and displays the web page (step S2016). The process then ends.

Figure 19:
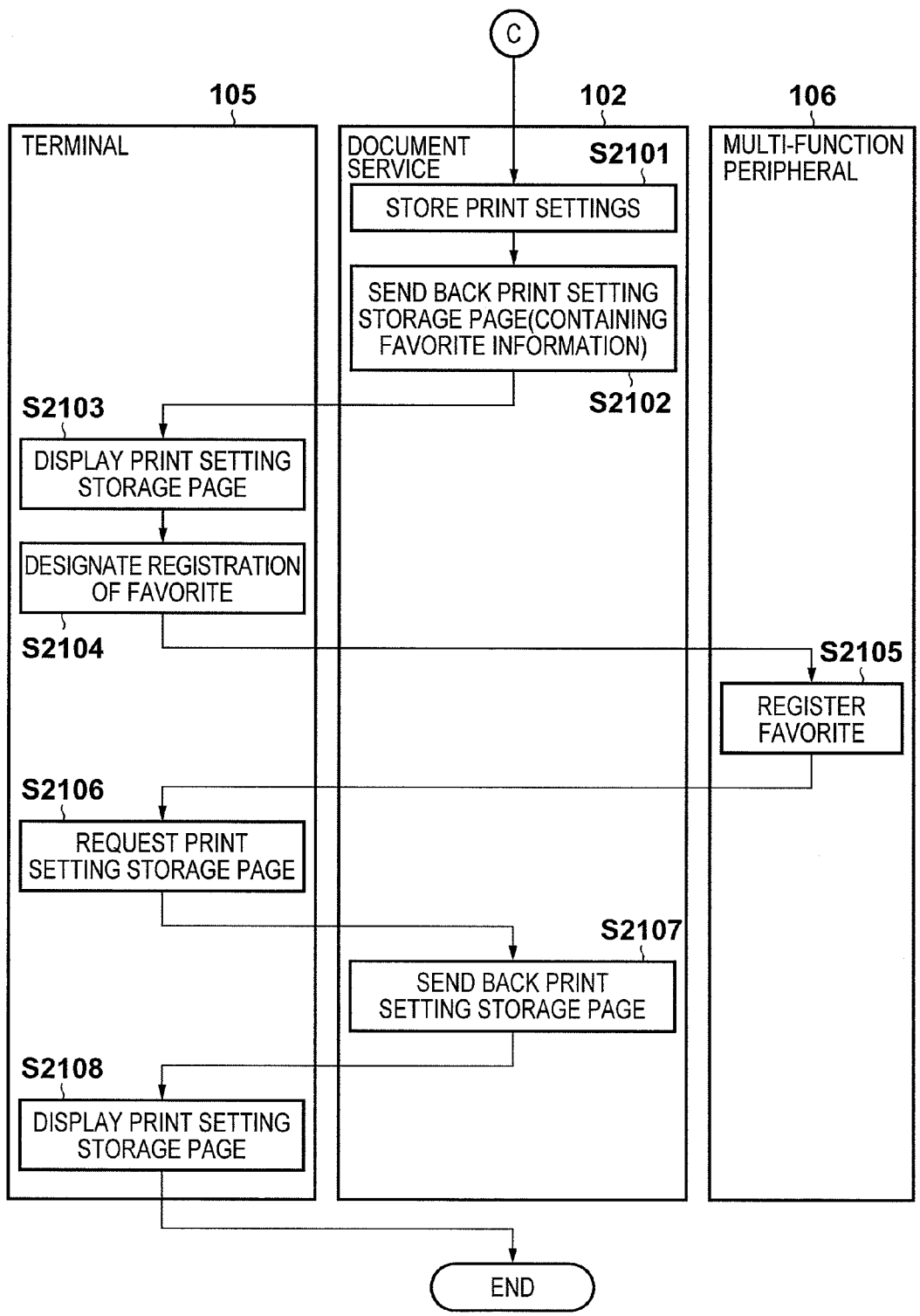
FIG. 19 is a flowchart showing a print processing sequence based on an instruction from a terminal.

Processing when the operation source terminal does not coincide with a device instructed to print (operation source terminal is the terminal 105) and it is not managed to execute printing quickly (operation source terminal is not registered in the print quick execution table) will be described with reference to FIG. 19.

The web container unit 502 of the document service 102 stores the print setting contents transferred from the terminal 105 in step S2011 (step S2101). At this time, the web container unit 502 generates a URL indicating a storage destination. This URL is stored in the favorites of the built-in web browser unit 521 of the multi-function peripheral 106. At this time, the web container unit 502 generates even the name of the favorite. In the embodiment, the favorite name is generated so that the favorite can be identified and sorted by the date and time, like "PrintMode_2010/09/13_12:42:30". However, the name is not limited to this, and a user understandable name may be assigned.

The web container unit 502 generates the web page 1820 and sends it back as a response to the terminal 105 (step S2102). The web page 1820 contains a script. In the embodiment, this script defines processing of transferring a message 701 to the multi-function peripheral 106 and adding a favorite. Note that the URL which has been generated in step S2101 and indicates a print setting storage destination is set in the Url tag of the message 701. The favorite name generated in step S2101 is set in the Name tag of the message 701.

The web browser unit 511 of the terminal 105 displays the web page 1820 sent back from the document service 102 in step S2102 (step S2103). After displaying the web page 1820 in step S2103, the web browser unit 511 executes the script contained in the web page, and transfers the message 701 to the multi-function peripheral 106. Accordingly, the web browser unit 511 instructs the multi-function peripheral 106 to register the favorite (step S2104).

Upon receiving the message 701 from the operation source terminal, the web service unit 523 of the multi-function peripheral 106 analyzes it. The web service unit 523 transfers the URL in the Url tag and the favorite name in the Name tag to the built-in web browser unit 521, and causes the built-in web browser unit 521 to register them (step S2105). Upon completion of registering the favorite, the web browser unit 511 of the terminal 105 requests the web page 1830 of the document service 102 (step S2106). The web container unit 502 of the document service 102 generates the web page 1830 and sends it back as a response to the terminal 105 (step S2107). The web browser unit 511 of the terminal 105 displays the web page 1830 sent back from the document service 102 in step S2107 (step S2108). The process then ends.

Figure 20:
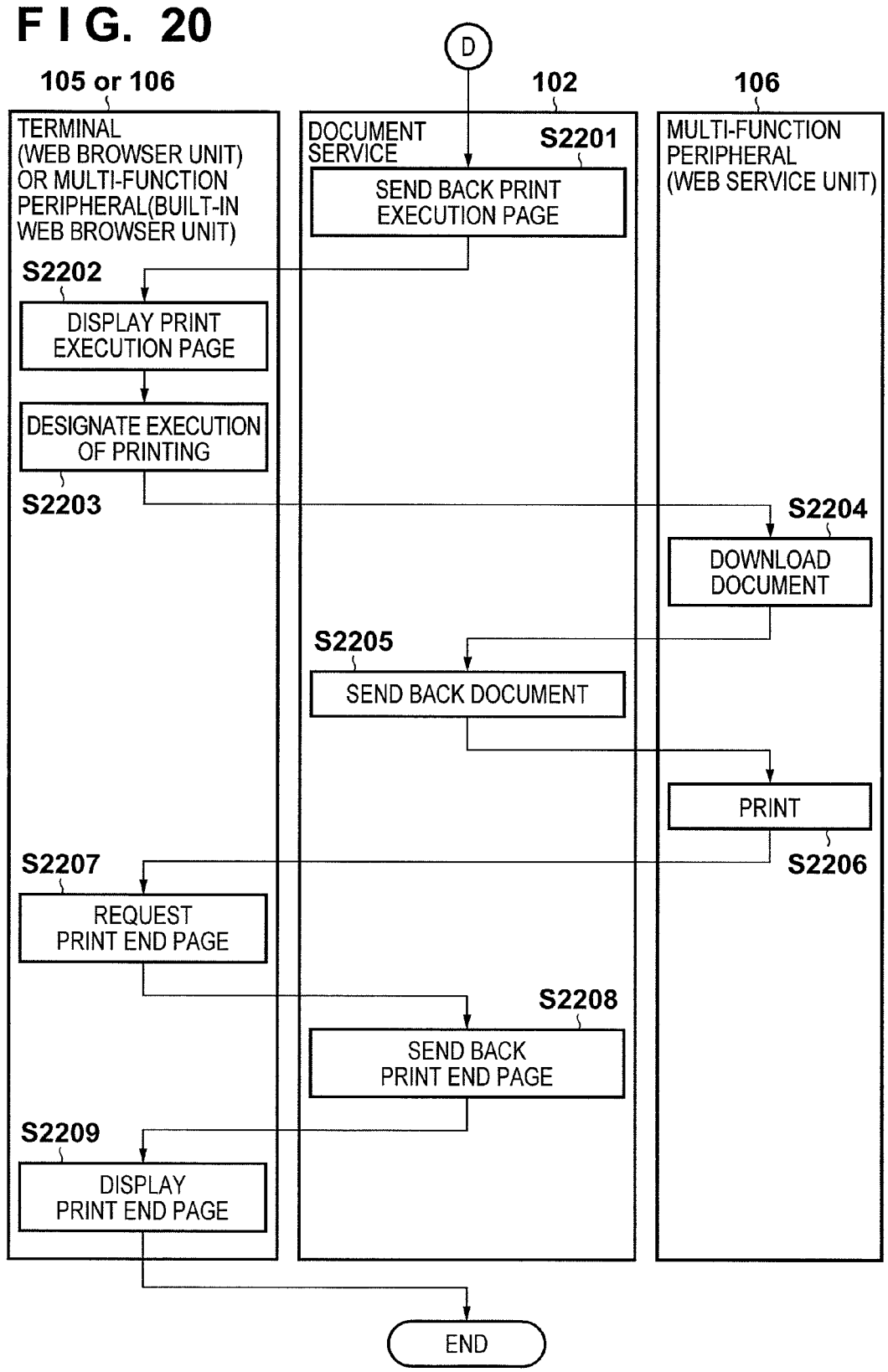
FIG. 20 is a flowchart showing a print processing sequence.

Next, processing when the operation source terminal coincides with a device instructed to print (operation source terminal is the multi-function peripheral 106) or when the operation source terminal is the terminal 105 and it is managed to execute printing quickly (operation source terminal is registered in the print quick execution table) will be described with reference to FIG. 20.

The web container unit 502 of the document service 102 generates the web page 1840 and sends it back as a response to the operation source terminal (step S2201). At this time, the web page 1840 contains a script. In the embodiment, this script defines processing of transferring the message 1701 to the multi-function peripheral 106 and causing the multi-function peripheral 106 to execute printing. The print setting contents transferred in step S2011 are set in respective tags below the PrintMode tag of the message 1701 shown in FIG. 15. The URL temporarily stored in step S2001 for a document to be printed which is stored by the document management unit 1602 is set in the Url tag of the message 1701.

The web browser unit of the operation source terminal displays the web page 1840 sent back from the document service 102 in step S2201 (step S2202). After displaying the web page 1840 in step S2202, the web browser unit executes the script contained in the web page, and transfers the message 1701 to the multi-function peripheral 106. By this, the web browser unit instructs the multi-function peripheral 106 to execute printing (step S2203).

Upon receiving the message 1701 from the operation source terminal, the web service unit 523 of the multi-function peripheral 106 analyzes it. The web service unit 523 transfers the URL set in the Url tag to the document service 102 and requests the document to be printed (step S2204). Also, the web service unit 523 temporarily stores print settings in respective tags below the PrintMode tag.

Upon receiving the request for the document to be printed via the communication I/F 204, the document management unit 1602 of the document service 102 sends back the document as a response to the multi-function peripheral 106 (step S2205). After the response, the document management unit 1602 deletes the document. Upon receiving the document to be printed, the web service unit 523 of the multi-function peripheral 106 prints the document in accordance with the print setting contents temporarily stored in step S2204 (step S2206).

After the end of printing, the web browser unit of the operation source terminal requests the web page 1850 of the document service 102 (step S2207). The web container unit 502 of the document service 102 generates the web page 1850 and sends it back as a response to the operation source terminal (step S2208). The web browser unit of the operation source terminal displays the web page 1850 sent back from the document service 102 in step S2208 (step S2209). The process then ends.

In the embodiment, a URL indicating a destination to which a web page request is redirected from the document service 102 to the business service 101 is temporarily stored as a return destination URL in step S2001. In the above description, the document service 102 redirects a web page request to the URL in accordance with the following instructions:

instruction to an OK button 1831 within the web page 1830
instruction to an OK button 1851 within the web page 1850

According to these instructions, the web browser unit 511 of the terminal 105 or the built-in web browser unit 521 of the multi-function peripheral 106 displays a web page provided by the business service.

(Print Processing by Favorite Selection)

Figure 21:
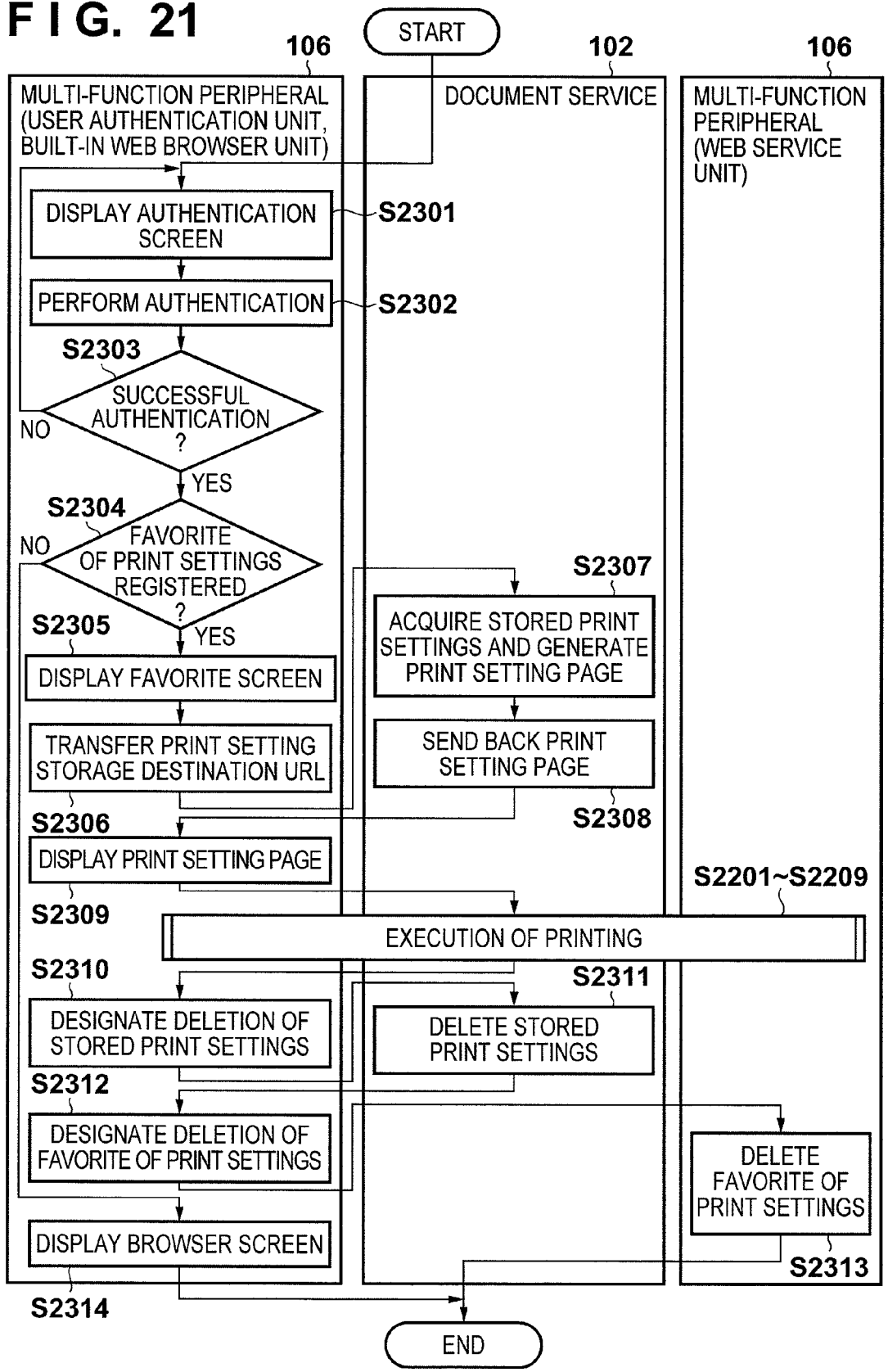
FIG. 21 is a flowchart showing a print processing sequence based on an instruction from a multi-function peripheral.

Processing of selecting a favorite registered in step S2105 in the built-in web browser unit 521 of the multi-function peripheral 106, and executing printing with the stored print settings will be explained with reference to FIG. 21.

The user authentication unit 524 of the multi-function peripheral 106 displays the screen 1900 (step S2301). Upon receiving user information from the card reader via the communication I/F 404, the user authentication unit 524 performs authentication (step S2302). The user authentication unit 524 determines whether the authentication is successful in step S2302 (step S2303). If the authentication is successful (YES in step S2303), the process shifts to step S2304; if the authentication has failed (NO in step S2303), returns to step S2301.

The user authentication unit 524 notifies the built-in web browser unit 521 of the successful authentication. The built-in web browser unit 521 determines whether a favorite containing a URL indicating print settings has been registered (step S2304). In the example of the embodiment, a favorite whose name starts "PrintMode" is determined as a favorite containing a URL indicating print settings. If the favorite has been registered (YES in step S2304), the process shifts to step S2305; if NO in step S2304, to step S2314.

In step S2305, the built-in web browser unit 521 displays the favorite screen 1910. The favorite 1911 is a favorite which has been registered in step S2105 and contains a URL indicating a print setting storage destination. If the user selects the favorite 1911, the built-in web browser unit 521 transfers the URL to the document service 102 to request a web page (step S2306). At this time, the built-in web browser unit 521 temporarily stores the URL and favorite name of the favorite 1911.

Upon receiving the URL request from the multi-function peripheral 106, the web container unit 502 of the document service 102 acquires print settings indicated by the URL. The web container unit 502 generates the web page 1810 which reflects the print settings (step S2307), and sends it back as a response to the multi-function peripheral 106 (step S2308). The built-in web browser unit 521 of the multi-function peripheral 106 displays the web page 1810 sent back from the document service 102 in step S2308 (step S2309).

Accordingly, the multi-function peripheral 106 can display print settings made on the terminal 105 by a simple operation of selecting the registered favorite 1911. When the user selects the OK button 1811 within the web page 1810, the multi-function peripheral 106 can execute printing (steps S2201 to S2209).

In the embodiment, the web page 1850 generated in step S2208 contains a script which defines the following processes:

transfer the message 1711 to the document service 102 and delete stored print settings
set, in the Url tag of the message 1711, a URL temporarily stored in step S2306
transfer the message 703 to the web service unit 523 and delete the favorite 1911
set, in the Url tag of the message 703, a URL temporarily stored in step S2306 and, in the Name tag, a favorite name temporarily stored in step S2306

After displaying the web page 1850 in step S2209, the built-in web browser unit 521 executes the script contained in the web page, and transfers the message 1711 to the document service 102. The built-in web browser unit 521 designates deletion of stored print settings (step S2310).

Upon receiving the message 1711 from the multi-function peripheral 106, the web container unit 502 of the document service 102 analyzes it. The web container unit 502 deletes the print settings indicated by the URL designated in the Url tag (step S2311). After the end of processing in step S2311, the built-in web browser unit 521 of the multi-function peripheral 106 transfers a message 702 to the web service unit 523. By this, the built-in web browser unit 521 designates deletion of the favorite 1911 (step S2312).

Upon receiving the message 702 from the multi-function peripheral 106, the web service unit 523 analyzes it. The web service unit 523 instructs the built-in web browser unit 521 to delete a favorite which matches the URL designated in the Url tag and the favorite name designated in the Name tag (step S2313). The process then ends.

If a favorite containing a URL indicating print settings has not been registered in step S2304 (NO in step S2304), the built-in web browser unit 521 displays the screen 910 (step S2314). Thereafter, the process ends.

As described above, according to the third embodiment, when a printer device on a local network is instructed to print from a service on the Internet, the possibility of leaving printed sheets can be reduced, enhancing security.

Fourth Embodiment

The first embodiment has described an example in which the document service 102 determines whether to store scan settings. In other words, the document service 102 determines an operation source. The fourth embodiment will explain another configuration, that is, an example in which a scanner device determines an operation source. Note that the system configuration and physical configuration according to the fourth embodiment are the same as those in the first embodiment, and a description thereof will be omitted.

(Logical Configuration)

Figures 22, 23:
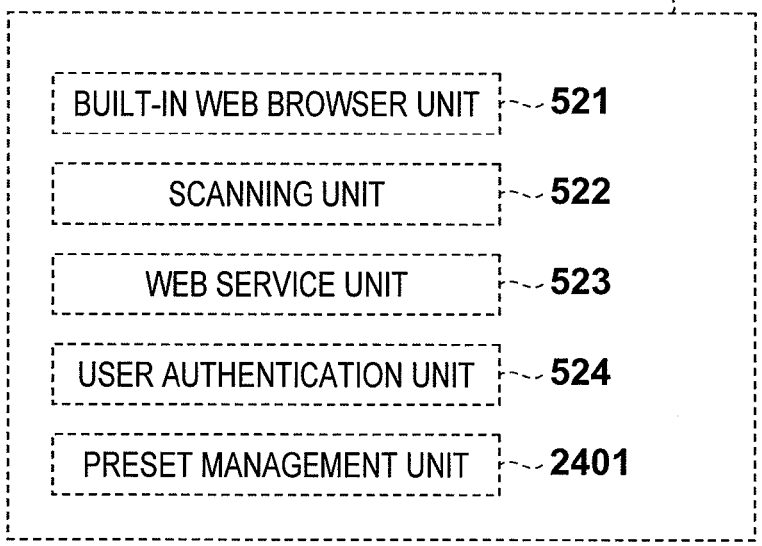
FIG. 22 is a block diagram showing the schematic logical configuration of a multi-function peripheral according to the fourth embodiment.
FIG. 23 is a schematic view exemplifying a data format.

The logical configurations of a document service 102 and terminal 105 are the same as those in the first embodiment. FIG. 22 is a block diagram showing the schematic logical configuration of a multi-function peripheral 106 in the fourth embodiment. A built-in web browser unit 521, scanning unit 522, web service unit 523, and user authentication unit 524 are the same as those in the first embodiment. A preset management unit 2401 stores and manages print and scan settings as a pre-defined preset in association with user information. The preset management unit 2401 executes a designated preset. This implements a preset execution unit.

(Web Service of Multi-Function Peripheral)

FIG. 23 is a table showing the format of data received by the web service unit 523 of the multi-function peripheral 106. A message 2501 contains settings used in a web service which causes the multi-function peripheral 106 to execute scanning and transfer. The web service executes scanning at designated settings and transfers the generated document to a designated designation by e-mail. The message 2501 is formed from a ScanToSend tag and contains the following pieces of information as parameters:

various scan settings (Color, Resolution, ScanSize, FileFormat, and Density tags below a ScanMode tag)

transfer destination (Address tag)

IP address (From tag) of an operation source terminal serving as a transfer source user information (Name (user name) and Password (password) below a User tag)

(Example of Screen)

Web pages displayed by a web browser unit 511 and the built-in web browser unit 521, and screens displayed by the user authentication unit 524 and preset management unit 2401 will be explained with reference to screen views. Display examples of web pages in the fourth embodiment are the same as those of web pages in FIGS. 6A, 6B, and 6F in the first embodiment. A display example of an operation panel 408 in the fourth embodiment is the same as that of the operation panel 408 shown in FIG. 6A in the first embodiment.

FIGS. 24A and 24B are views showing display examples of web pages representing setting and execution of scanning. When the user selects a scanner device on a web page 800 and designates a Next button 804, the web page 800 changes to a web page 810. When the user makes scan settings on the web page 810 and selects an OK button 811, the web page 810 changes to a web page 2600 (processing page) shown in FIG. 24A.

The web page 2600 represents that processing is being executed. When the operation source terminal is the terminal 105, the web page 2600 changes to a web page 2610 (scan setting storage page) after the end of processing (storage of scan settings). When the operation source terminal is the multi-function peripheral 106, the web page 2600 changes to a web page 850 shown in FIG. 6F after the end of processing (scanning).

The web page 2610 displays a message indicating that scan settings have been stored. When the display and operation are done on the web browser unit 511 of the terminal 105, no scanning is executed. The contents of scan settings are stored as a preset to be managed by the preset management unit 2401 of the multi-function peripheral 106. The web page 2610 also displays the name ("ScanMode_2010/09/06_16:11:30") of the preset.

Figure 25A:
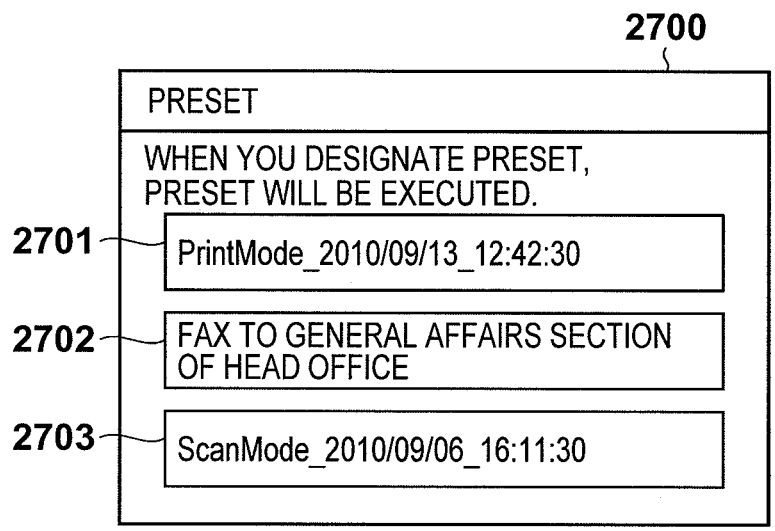
FIGS. 25A and 25B are views showing display examples of screens.
Figure 25B:
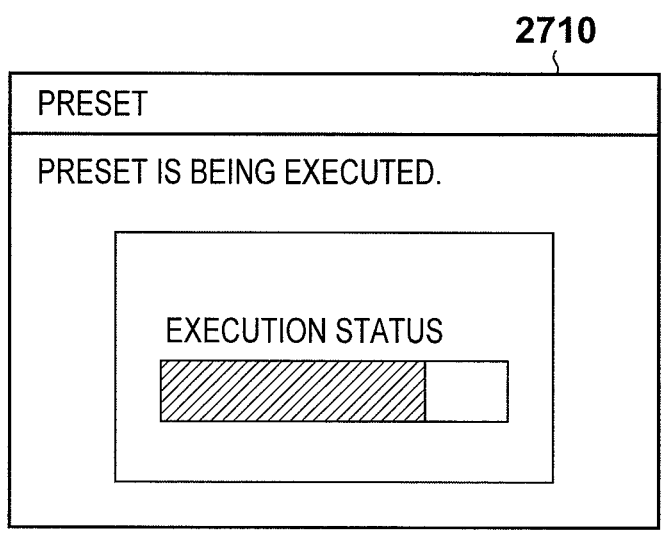

Designation of a preset (scan settings) registered in the preset management unit 2401 of the multi-function peripheral 106 will be explained with reference to FIGS. 25A and 25B. FIGS. 25A and 25B are views showing display examples on the operation panel 408 of the multi-function peripheral 106. When the user selects an OK button 903 within a screen 900, the screen 900 changes to a screen 2700 (preset screen) shown in FIG. 25A.

The preset management unit 2401 generates display data of the screen 2700 shown in FIG. 25A and displays it on the operation panel 408. The preset management unit 2401 stores and manages presets 2701, 2702, and 2703 in association with a user currently authenticated by the user authentication unit 524. When the user selects one of these presets, the multi-function peripheral 106 executes scanning or printing based on the stored setting contents.

The preset 2703 corresponds to scan setting contents stored based on the display and operation on the web browser unit 511 of the terminal 105. When the user selects the preset 2703, the screen 2700 changes to a screen 2710 (preset execution screen) shown in FIG. 25B. Then, scanning is executed in accordance with the stored scan setting contents. The screen 2710 displays a message indicating that processing is being executed using settings registered in the preset. After the end of processing, the screen 2710 changes to the screen 2700.

(Scan Processing and Scan Setting Storage Processing)

Processing when the scanner device scans an original in accordance with an instruction from the document service 102 will be explained. Processing until the operation source terminal instructs the document service 102 to scan will be described.

FIG. 26 is a flowchart showing the sequence of processing to be performed between the document service 102, the terminal 105, and the multi-function peripheral 106 when scanning is designated. The document service 102 and operation source terminal execute processes in steps S1001 to S1010 shown in FIG. 8 in the first embodiment. If the user selects the OK button 811 within the web page 810 shown in FIG. 6B, the web browser unit of the operation source terminal requests the web page 2600 of the document service 102 (step S2801).

In response to the request from the operation source terminal, the document service 102 generates the web page 2600 and sends it back as a response to the operation source terminal (step S2802). The web page 2600 contains a script. In the embodiment, this script defines processing of transferring the message 2501 to the multi-function peripheral 106. At this time, the scan setting contents set on the web page 810 are set in respective tags below the ScanMode tag of the message 2501. The destination temporarily stored in step S1001 is set in the Address tag of the message 2501. The IP address of the operation source terminal is set in the From tag of the message 2501, but is blank in this case. User information of a user authenticated in step S1002 is set in the User tag of the message 2501.

The web browser unit of the operation source terminal displays the web page 2600 sent back from the document service 102 in step S2802 (step S2803). After displaying the web page 2600 in step S2803, the web browser unit of the operation source terminal executes the script contained in the web page, and transfers the message 2501 to the multi-function peripheral 106. Then, the operation source terminal instructs the multi-function peripheral 106 to execute scanning (step S2804). At this time, the IP address of the operation source terminal is set in the From tag within the message 2501.

Upon receiving the message 2501 from the operation source terminal, the web service unit 523 of the multi-function peripheral 106 analyzes it. The web service unit 523 determines whether the operation source terminal and the device (which is the multi-function peripheral 106 and is to execute scanning) to which the web service unit 523 belongs are the same device (step S2805). This determination is executed as follows. The web service unit 523 acquires, from a TCP/IP packet in communication with the operation source terminal, the global address of a local network to which the operation source terminal belongs. If the acquired global address matches the global address of a local network to which the multi-function peripheral 106 belongs, and the IP address (contents of the From tag) of the transferring device matches the IP address of the multi-function peripheral 106, the web service unit 523 determines that the operation source terminal and device are the same device. If the operation source terminal and device are the same device (YES in step S2805), the process shifts to step S2806; if NO in step S2805, to step S2811.

The web service unit 523 of the multi-function peripheral 106 transfers, to the scanning unit 522, scan settings in respective tags below the ScanMode tag of the message 2501 transferred in step S2804, and executes scanning (step S2806). Scanning is executed quickly because it has been determined in step S2805 that the built-in web browser unit 521 has transferred the message 2501. After the end of scanning in step S2806, the web service unit 523 of the multi-function peripheral 106 transfers the generated document to the destination set in the Address tag of the message 2501 (step S2807). Upon completion of transfer in step S2807, the web service unit 523 sends back, as a response to the message 2501 to the operation source terminal (in this case, the built-in web browser unit 521 of the multi-function peripheral 106), a message indicating that scanning has been executed. The built-in web browser unit 521 of the multi-function peripheral 106 requests the web page 850 of the document service 102 (step S2808).

In response to the request from the multi-function peripheral 106, the document service 102 generates the web page 850 and sends it back as a response to the multi-function peripheral 106 (step S2809). The built-in web browser unit 521 of the multi-function peripheral 106 receives and displays the web page 850 (step S2810). The process then ends.

If the web service unit 523 determines in step S2805 that the operation source terminal and multi-function peripheral 106 do not coincide with each other (NO in step S2805), it transfers, to the preset management unit 2401, the following pieces of information in the message 2501 transferred in step S2804:

scan settings in respective tags below the ScanMode tag
transfer destination of a document generated by scanning that is set in the Address tag
user information set in the User tag The preset management unit 2401 stores and manages the scan settings in association with the user information (step S2811). At this time, the user authentication unit 524 may perform authentication to confirm that the user information is authentic. After the end of storage by the preset management unit 2401, the web service unit 523 of the multi-function peripheral 106 sends back, as a response to the message 2501 to the operation source terminal (in this case, the terminal 105), a message indicating that storage is complete. At this time, the name of the registered preset is also transferred.

The web browser unit 511 of the terminal 105 requests the web page 2610 of the document service 102 (step S2812). At this time, the name of the preset registered in step S2811 is also transferred. In response to the request from the terminal 105, the document service 102 generates the web page 2610 and sends it back as a response to the terminal 105 (step S2813). At this time, the received preset name is reflected in the display contents. The web browser unit 511 of the terminal 105 receives the web page 2610 from the document service 102 and displays it (step S2814). Thereafter, the process ends.

(Scan Processing by Preset Selection)

Figure 27:
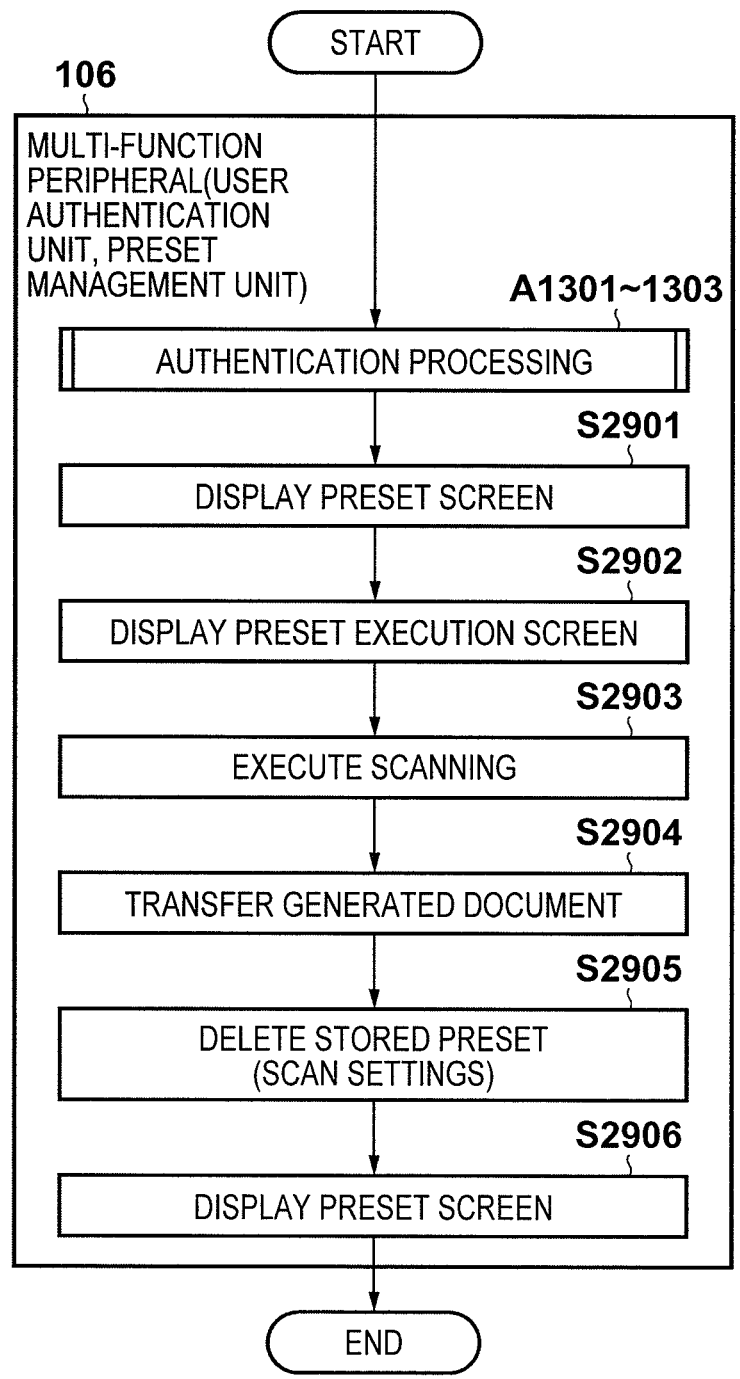
FIG. 27 is a flowchart showing a scan processing sequence in the multi-function peripheral.

Processing of selecting a preset registered in step S2811 in the preset management unit 2401 of the multi-function peripheral 106, and executing scanning at the settings of the selected preset will be explained with reference to FIG. 27. First, the multi-function peripheral 106 executes processes (authentication processing) in steps S1301 to S1303. These processes are the same as those described with reference to FIG. 11 in the first embodiment.

If the authentication is successful in step S1303, the preset management unit 2401 of the multi-function peripheral 106 displays the screen 2700 (step S2901). If the user selects the preset 2703, the preset management unit 2401 displays the screen 2710 (step S2902). The multi-function peripheral 106 executes scanning based on the scan settings stored in step S2811 (step S2903). After the end of scanning, the multi-function peripheral 106 transfers the generated document to the destination set in the Address tag (step S2904).

After the end of processing set by the preset 2703, the preset management unit 2401 deletes the preset 2703 (step S2905). The preset management unit 2401 displays the screen 2700 (step S2906). The process then ends.

In this fashion, it can be configured to determine by a scanner device whether to store scan settings.

Fifth Embodiment

The third embodiment has described an example in which the document service determines whether to store print settings. The fifth embodiment will explain another configuration, that is, an example in which a printer device makes this determination. Note that the system configuration and physical configuration in the fifth embodiment are the same as those in the third embodiment, and a description thereof will be omitted.

(Logical Configuration)

The logical configurations of a document service 102 and terminal 105 are the same as those in the third embodiment. FIG. 28 is a block diagram showing the schematic logical configuration of a multi-function peripheral 106 in the fifth embodiment. A built-in web browser unit 521, web service unit 523, user authentication unit 524, document acquisition unit 1611, and printing unit 1612 are the same as those in the third embodiment. A preset management unit 2401 is the same as that in the fourth embodiment.

(Web Service of Multi-Function Peripheral)

FIG. 29 is a table showing the format of data received by the web service unit 523 of the multi-function peripheral 106. A message 3101 contains settings used in a web service which causes the multi-function peripheral 106 to execute printing. The web service executes printing at designated settings. The message 3101 is formed from a Print tag and contains the following pieces of information as parameters:

various print settings (Count, PaperSize, Staple, and Two-Side tags below a PrintMode tag)
URL (Url tag) indicating the storage destination of a document to be printed
IP address (From tag) of an operation source terminal serving as a transfer source
user information (Name (user name) and Password (password) below a User tag)

(Example of Screen)

Display examples of web pages in the fifth embodiment are the same as those of web pages shown in FIGS. 16A, 16B, and 16F. A display example of an operation panel in the fifth embodiment is the same as that of the operation panel 408 shown in FIG. 17A. A display example of a web page in the fifth embodiment is the same as that of the web page shown in FIG. 24A. Further, display examples of screens in the fifth embodiment are the same as the screens shown in FIGS. 25A and 25B. A preset 2701 shown in FIG. 25A corresponds to print setting contents stored based on the display and operation on a web browser unit 511 of the terminal 105. When the user designates the preset 2701, printing is executed in accordance with the print setting contents registered as a preset.

FIG. 30 is a view showing a display example of a web page representing setting of printing. A web page 3200 (print setting storage page) displays a message indicating that print settings have been stored. No printing is executed when the display and operation are done on the web browser unit 511 of the terminal 105. At this time, print setting contents are stored as a preset managed by the preset management unit 2401 of the multi-function peripheral 106. The web page 3200 also displays the name ("PrintMode_2010/09/13_12:42:30") of the preset.

(Print Processing and Print Setting Storage Processing)

Processing when the printer device prints a document in accordance with an instruction from the document service 102 will be explained. Processing until the operation source terminal instructs the document service 102 to print will be described.

Figure 31:
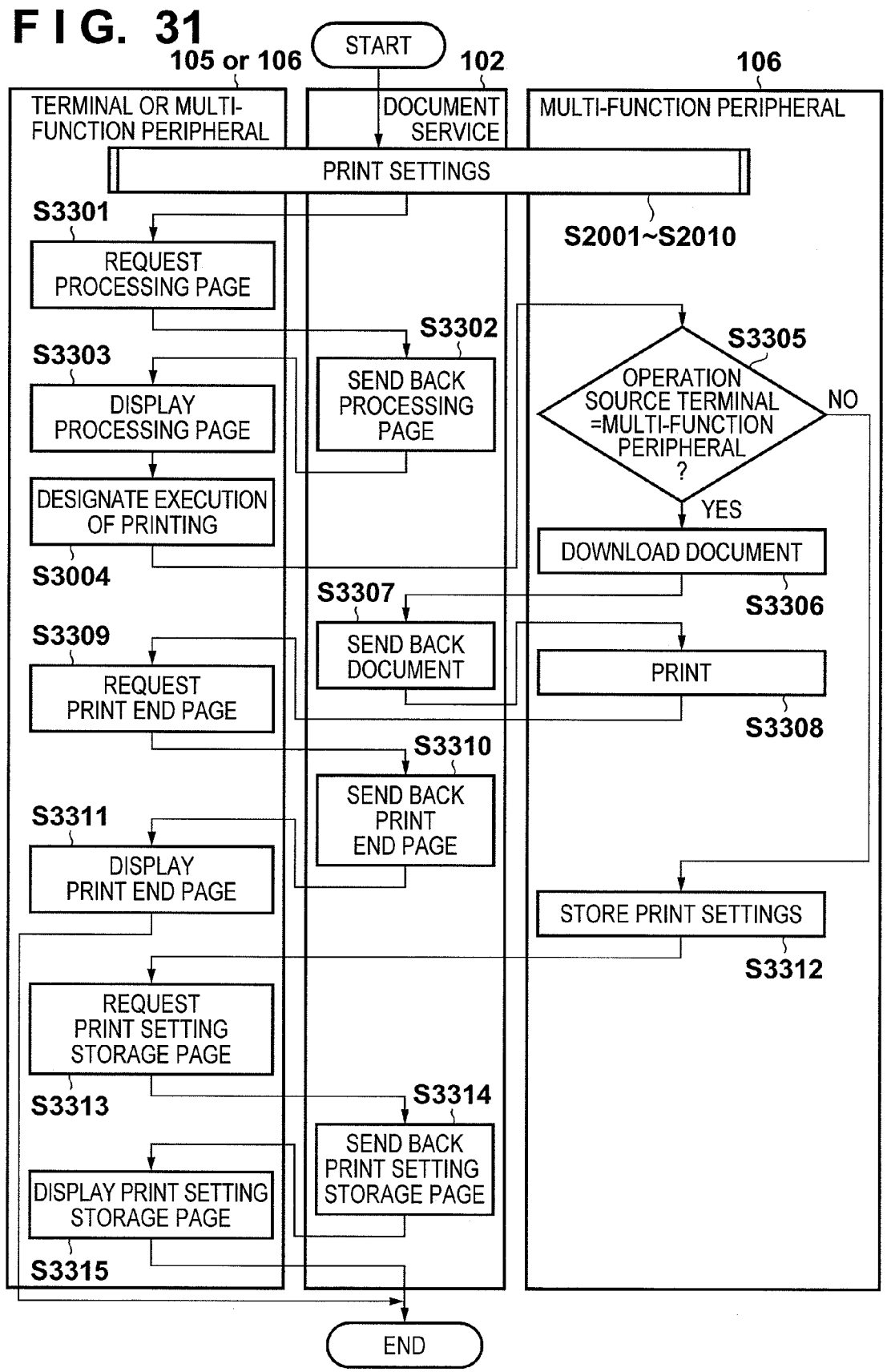
FIG. 31 is a flowchart showing a print processing sequence according to the fifth embodiment.

FIG. 31 is a flowchart showing the sequence of processing to be performed between the document service 102, the terminal 105, and the multi-function peripheral 106 when printing is designated. The document service 102 and operation source terminal execute processes in steps S2001 to S2010. These processes are the same as those shown in FIG. 19.

If the user selects an OK button 1811 within a web page 1810 shown in FIG. 16B, the web browser unit of the operation source terminal requests a web page 2600 of the document service 102 (step S3301). In response to the request from the operation source terminal, the document service 102 generates the web page 2600 and sends it back as a response to the operation source terminal (step S3302). At this time, the web page 2600 contains a script. In the embodiment, this script defines processing of transferring the message 3101 to the multi-function peripheral 106. The print setting contents set on the web page 1810 are set in respective tags below the PrintMode tag of the message 3101. The URL temporarily stored in step S2001 for a document to be printed which is stored by the document management unit 1602 is set in the Url tag of the message 3101. The IP address of the operation source terminal is set in the From tag of the message 3101, but is blank in this case. User information of a user authenticated in step S2002 is set in the User tag of the message 3101.

The web browser unit of the operation source terminal displays the web page 2600 sent back from the document service 102 in step S3302 (step S3303). Immediately after displaying the web page 2600 in step S3303, the web browser unit of the operation source terminal executes the script contained in the web page, and transfers the message 3101 to the multi-function peripheral 106. By this, the web browser unit instructs the multi-function peripheral 106 to execute printing (step S3304). At this time, the IP address of the operation source terminal is set in the From tag within the message 3101.

Upon receiving the message 3101 from the operation source terminal, the web service unit 523 of the multi-function peripheral 106 analyzes it. The web service unit 523 determines whether the operation source terminal and the device (which is the multi-function peripheral 106 and is to execute printing) to which the web service unit 523 belongs are the same device (step S3305). This determination is executed as follows. The web service unit 523 acquires, from a TCP/IP packet in communication with the operation source terminal, the global address of a local network to which the operation source terminal belongs. If the acquired global address matches the global address of a local network to which the multi-function peripheral 106 belongs, and the IP address (contents of the From tag) of the transferring device matches the IP address of the multi-function peripheral 106, the web service unit 523 determines that the operation source terminal and device are the same device. If the operation source terminal and device are the same device (YES in step S3305), the process shifts to step S3306; if NO in step S3305, to step S3312.

The web service unit 523 of the multi-function peripheral 106 analyzes the received message 3101. Then, the web service unit 523 transfers the URL set in the Url tag to the document service 102, and requests a document to be printed (step S3306). In addition, the web service unit 523 temporarily stores print settings in respective tags below the PrintMode tag. Upon receiving the request for the document to be printed from the multi-function peripheral 106 via a communication I/F 204, the document management unit 1602 of the document service 102 sends back the document as a response to the multi-function peripheral 106 (step S3307). After sending back the document as a response, the document management unit 1602 deletes the document.

Upon receiving the document to be printed from the document service 102, the web service unit 523 of the multi-function peripheral 106 prints the document in accordance with the print setting contents temporarily stored in step S3306 (step S3308). After the end of printing, the web browser unit of the operation source terminal (in this case, the built-in web browser unit 521 of the multi-function peripheral 106) requests a web page 1850 shown in FIG. 16F of the document service 102 (step S3309). In response to the request from the multi-function peripheral 106, the document service 102 generates the web page 1850 and sends it back as a response to the multi-function peripheral 106 (step S3310). The built-in web browser unit 521 of the multi-function peripheral 106 displays the web page 1850 sent back from the document service 102 in step S3310 (step S3311). The process then ends.

If the web service unit 523 determines in step S3305 that the operation source terminal and multi-function peripheral 106 do not coincide with each other (NO in step S3305), it transfers, to the preset management unit 2401, the following pieces of information in the message 3101 transferred in step S3304:

print settings in respective tags below the PrintMode tag
URL of a document to be printed that is set in the Url tag
user information set in the User tag The preset management unit 2401 stores and manages the print settings in association with the user information (step S3312). At this time, the user authentication unit 524 may perform authentication to confirm that the user information is authentic. After the end of storage by the preset management unit 2401, the web service unit 523 sends back, as a response to the message 3101 to the operation source terminal (in this case, the terminal 105), a message indicating that storage is complete. At this time, the name of the registered preset is also transferred.

Subsequently, the web browser unit 511 of the terminal 105 requests the web page 3200 of the document service 102 (step S3313). At this time, the name of the preset registered in step S3312 is also transferred. In response to the request from the terminal 105, the document service 102 generates the web page 3200 and sends it back as a response to the terminal 105 (step S3314). At this time, the received preset name is reflected in the display contents. The web browser unit 511 of the terminal 105 receives the web page 3200 from the document service 102 and displays it (step S3315). Then, the process ends.

(Print Processing by Preset Selection)

Processing of designating a preset registered in step S3312 in the preset management unit 2401 of the multi-function peripheral 106, and executing printing at the stored print settings will be explained with reference to FIG. 32.

First, the multi-function peripheral 106 executes processes (authentication processing) in steps S2301 to S2303. These processes are the same as those described with reference to FIG. 21 in the third embodiment. If the authentication is successful in step S2303, the preset management unit 2401 of the multi-function peripheral 106 displays a screen 2700 shown in FIG. 25A (step S3401). If the user selects the preset 2701 within the screen 2700, the preset management unit 2401 displays a screen 2710 (step S3402). The preset management unit 2401 transfers, to the document service 102, the URL of a document to be printed that has been stored in step S3312, and requests the document to be printed (step S3403).

Upon receiving the request for the document to be printed from the multi-function peripheral 106 via the communication I/F 204, the document management unit 1602 of the document service 102 sends back the document as a response to the multi-function peripheral 106 (step S3404). After transferring the document as a response, the document management unit 1602 deletes the document. The preset management unit 2401 of the multi-function peripheral 106 executes printing based on the print settings stored in step S3312 (step S3405). After the end of printing in accordance with the settings of the preset 2701, the preset management unit 2401 deletes the preset 2701 (step S3406). The preset management unit 2401 displays the screen 2700 (step S3407). After that, the process ends.

In this way, it can be configured to determine by a printer device whether to store print settings.

In each embodiment, communication between the business service 101, the document service 102, the terminal 105, and the multi-function peripheral 106 may be executed in a security-guaranteed form such as SSL (Secure Socket Layer).

The embodiments in this specification have described print processing and scan processing. However, processing can be executed in the same processing sequence for a function of the multi-function peripheral. Therefore, processing described in this specification can be applied to even another function and configured as a service providing system.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-005243, filed Jan. 13, 2011, which is hereby incorporated by reference herein in its entirety.

What is claimed is:

1. A scanning system comprising a scan server, scanner device, and terminal which are connected to a network, the scanner device including:
    a first instruction unit configured to transfer a scan processing setting and a start instruction to the scan server;
    an execution unit configured to receive a scan processing setting and a start instruction from the scan server and to execute scan processing; and
    a memory unit configured to store identification information that is issued by the scan server and to indicate the scan processing setting,
the terminal including a second instruction unit configured to transfer a scan processing setting and a start instruction to the scan server, and
the scan server including:
    a reception unit configured to receive the scan processing setting and the start instruction from one of the first instruction unit and the second instruction unit;
    a storage unit configured to store the scan processing setting received by the reception unit and to issue the identification information;
    a determination unit configured to determine which of the first instruction unit and the second instruction unit has transferred the scan processing setting and start instruction received by the reception unit; and
    a processing unit configured, when the determination unit determines that the first instruction unit has transferred the scan processing setting and the start instruction, to transfer the scan processing setting and the start instruction to the scanner device, and when the determination unit determines that the second instruction unit has transferred the scan processing setting and the start instruction, to cause the storage unit to store the scan processing setting and to transfer, to the scanner device, identification information indicating the stored scan processing setting.

2. The system according to claim 1, wherein the scanner device further includes an identification information transmission unit configured to transmit the identification information stored in the memory unit to the scan server,
    wherein the scan server further includes a settings transmission unit configured to transmit, to the scanner device, a scan processing setting indicated by the identification information transmitted by the identification information transmission unit, and
    wherein the second instruction unit receives the scan processing setting transmitted by the settings transmission unit, and transfers the received scan processing setting and a start instruction.

3. The system according to claim 1, wherein the scan server further includes a register unit configured to register, in a memory unit, a terminal that, upon receiving a scan processing setting and a start instruction from the second instruction unit, causes the processing unit to perform the same processing as in the transfer from the first instruction unit, and
    wherein when a second instruction unit of the terminal registered in the memory unit of the scan server transfers a scan processing setting and a start instruction, the determination unit causes the processing unit to perform the same processing as in the transfer from the first instruction unit.

4. The system according to claim 1, wherein the processing unit of the scan server generates a script, causes the terminal to execute the script, and transfers a scan setting and a start instruction, or identification information to the scanner device.

5. The system according to claim 1, wherein the memory unit of the scanner device deletes the identification information after scan processing corresponding to the identification information ends or a predetermined time has elapsed.

6. A service providing system comprising a server, device, and terminal which are connected to a network, the device including:
- a first instruction unit configured to transfer a processing setting and a start instruction in a provided service to the server;
- an execution unit configured to receive a processing setting and a start instruction from the server and to execute processing; and
- a memory unit configured to store identification information that is issued by the server and indicates the processing setting, the terminal including a second instruction unit configured to transfer a processing setting and a start instruction to the server, and the server including:
- a reception unit configured to receive the processing setting and the start instruction from one of the first instruction unit and the second instruction unit;
- a storage unit configured to store the processing setting received by the reception unit and to issue the identification information;
- a determination unit configured to determine which of the first instruction unit and the second instruction unit has transferred the processing setting and start instruction received by the reception unit; and
- a processing unit configured, when the determination unit determines that the first instruction unit has transferred the processing setting and the start instruction, to transfer the processing setting and the start instruction to the device, and when the determination unit determines that the second instruction unit has transferred the processing setting and the start instruction, to cause the storage unit to store the processing setting and to transfer, to the device, identification information indicating the stored processing setting.

7. A service providing system comprising a server, device, and terminal which are connected to a network, the terminal including a second instruction unit configured to transfer a processing setting and a start instruction in a provided service via the server, and the device including:
- a first instruction unit configured to transfer a processing setting and a start instruction via the server;
- a reception unit configured to receive a processing setting and a start instruction from the server;
- an execution unit configured to execute processing based on the processing setting received by the reception unit;
- a storage unit configured to store the processing setting received by the reception unit; and
- a determination unit configured to determine which of the first instruction unit and the second instruction unit has transferred the processing setting and start instruction received by the reception unit, wherein when the determination unit determines that the first instruction unit has transferred the processing setting and the start instruction, the execution unit executes processing, and wherein when the determination unit determines that the second instruction unit has transferred the processing setting and the start instruction, the storage unit stores the processing setting.

8. A control method in a scanning system including a scan server, scanner device, and terminal which are connected to a network, the control method comprising:

in the scanner device,
- transferring a scan processing setting and a start instruction to the scan server;
- receiving a scan processing setting and a start instruction from the scan server and executing scan processing; and
- storing, in a memory unit, identification information that is issued by the scan server and indicates the scan processing setting, in the terminal, transferring a scan processing setting and a start instruction to the scan server, and in the scan server,
- receiving the scan processing setting and the start instruction in one of the scanner device and the terminal;
- storing, in a memory unit, the received scan processing setting and issuing the identification information;
- determining in which of the scanner device and the terminal, the received scan processing setting and the received start instruction have been transferred; and
- when the scan processing setting and the start instruction are determined to have been transferred in the scanner device, transferring the scan processing setting and the start instruction to the scanner device, and when the scan processing setting and the start instruction are determined to have been transferred in the second instruction step terminal, storing the scan processing setting in the memory unit and transferring, to the scanner device, identification information indicating the stored scan processing setting.

* * * * *